US010219291B2

(12) United States Patent
Pelletier et al.

(10) Patent No.: US 10,219,291 B2
(45) Date of Patent: Feb. 26, 2019

(54) METHODS TO ENABLE SCHEDULING AND CONTROL OF DIRECT LINK COMMUNICATION IN CELLULAR COMMUNICATION SYSTEMS

(71) Applicant: INTERDIGITAL PATENT HOLDINGS, INC., Wilmington, DE (US)

(72) Inventors: Ghyslain Pelletier, Laval (CA); Diana Pani, Montreal (CA); Benoit Pelletier, Montreal (CA); Christopher R. Cave, Montreal (CA); Paul Marinier, Brossard (CA); Tao Deng, Roslyn, NY (US); Gwenael Poitau, Montreal (CA); Kiran K. Vanganuru, King of Prussia, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 1385 days.

(21) Appl. No.: 13/907,368

(22) Filed: May 31, 2013

(65) Prior Publication Data
US 2013/0322413 A1 Dec. 5, 2013

Related U.S. Application Data

(60) Provisional application No. 61/653,946, filed on May 31, 2012, provisional application No. 61/793,412, filed on Mar. 15, 2013.

(51) Int. Cl.
*H04W 72/12* (2009.01)
*H04W 76/14* (2018.01)
(Continued)

(52) U.S. Cl.
CPC ....... *H04W 72/1289* (2013.01); *H04L 1/1822* (2013.01); *H04L 5/0091* (2013.01);
(Continued)

(58) Field of Classification Search
CPC .......... H04W 72/042; H04W 72/0413; H04W 72/0446; H04W 88/08; H04W 72/0406;
(Continued)

(56) References Cited

U.S. PATENT DOCUMENTS

2005/0135295 A1 6/2005 Walton et al.
2009/0249153 A1 10/2009 Zhang
(Continued)

FOREIGN PATENT DOCUMENTS

WO 2010/082084 7/2010

OTHER PUBLICATIONS

China Telecom, "Email Discussion Summary on Coverage Issues Identification," 3GPP TSG RAN WG1 #68, R1-120008, Dresden, Germany (Feb. 6-10, 2012).
(Continued)

Primary Examiner — Natasha W Cosme
(74) Attorney, Agent, or Firm — Volpe and Koenig, P.C.

(57) ABSTRACT

A method and apparatus for enabling scheduling and control of direct link communication in a cellular communication system may be disclosed. A method for use in a first wireless transmit/receive unit (WTRU) may include transmitting a request for device-to-device (D2D) communication resources to an enhanced Node B (eNB). The first WTRU may receive an allocation of resources for multiple transmission time intervals (TTI) to be used for D2D communications from the eNB. The first WTRU may schedule D2D communications with a second WTRU to be performed during the allocated resources. The first WTRU may perform D2D communications with the second WTRU using half duplex communications during the allocated resources.

19 Claims, 8 Drawing Sheets

(51) Int. Cl.
*H04W 72/04* (2009.01)
*H04L 1/18* (2006.01)
*H04L 5/00* (2006.01)
*H04W 88/12* (2009.01)
*H04W 92/18* (2009.01)

(52) U.S. Cl.
CPC ....... *H04W 72/0406* (2013.01); *H04W 76/14* (2018.02); *H04L 1/1896* (2013.01); *H04W 72/042* (2013.01); *H04W 72/0413* (2013.01); *H04W 72/12* (2013.01); *H04W 92/18* (2013.01)

(58) Field of Classification Search
CPC ........... H04W 76/048; H04W 72/0453; H04W 24/10; H04W 72/12; H04W 88/06; H04W 52/146; H04W 72/1289; H04W 24/02; H04W 72/04; H04W 72/048; H04W 88/02; H04W 52/021
USPC ........................ 709/226; 370/311, 329, 336
See application file for complete search history.

(56) References Cited

U.S. PATENT DOCUMENTS

| | | | |
|---|---|---|---|
| 2010/0004016 A1* | 1/2010 | Yin ...................... | H04W 52/08 455/522 |
| 2010/0014478 A1* | 1/2010 | Futagi .................. | H04L 1/1819 370/329 |
| 2011/0106952 A1 | 5/2011 | Doppler et al. | |
| 2012/0077510 A1 | 3/2012 | Chen et al. | |
| 2012/0106517 A1* | 5/2012 | Charbit ................ | H04W 72/04 370/336 |
| 2012/0120892 A1 | 5/2012 | Freda et al. | |
| 2013/0064103 A1* | 3/2013 | Koskela ............ | H04W 72/1284 370/252 |
| 2013/0178221 A1* | 7/2013 | Jung .................... | H04L 9/0844 455/450 |
| 2013/0223356 A1* | 8/2013 | Khoshnevis ........ | H04W 72/042 370/329 |
| 2014/0003319 A1* | 1/2014 | Etemad ................ | H04W 28/08 370/312 |
| 2014/0064203 A1* | 3/2014 | Seo ...................... | H04W 28/06 370/329 |
| 2015/0071212 A1* | 3/2015 | Kim .................... | H04W 72/042 370/329 |

OTHER PUBLICATIONS

Ericsson, "HARQ operation in case of UL Power Limitation," 3GPP TSG-RAN WG2 #58bis, R2-072630, Orlando, Florida, USA (Jun. 25-29, 2007).

Qualcomm Inc. et al., "WID for Proximity Services Specification," 3GPP TSG SA WG2 Meeting #94, S2-124826, New Orleans, Louisiana, USA (Nov. 12-16, 2012).

Qualcomm Inc., "WID—Proposal for ProSe Normative Work," 3GPP TSG-SA WG1 #60, S1-124396, Edinburgh, United Kingdom (Nov. 12-16, 2012).

Seppala et al., "Network Controlled Device-to-Device (D2D) and Cluster Multicast Concept for LTE and LTE-A Networks," IEEE Wireless Communications and Networking Conference, pp. 986-991 (Mar. 28-31, 2011).

Susitaival et al., "LTE Coverage Improvement by TTI Bundling," IEEE 69th Vehicular Technology Conference, Barcelona, Spain, pp. 1-5 (Apr. 26-29, 2009).

Third Generation Partnership Project, "Technical Specification Group Radio Access Network; Evolved Universal Terrestrial Radio Access (E-UTRA); Physical layer procedures (Release 8)," 3GPP TS 36.213 V8.8.0 (Sep. 2009).

Third Generation Partnership Project, "Technical Specification Group Radio Access Network; Evolved Universal Terrestrial Radio Access (E-UTRA); Physical layer procedures (Release 9)," 3GPP TS 36.213 V9.3.0 (Sep. 2010).

Third Generation Partnership Project, "Technical Specification Group Radio Access Network; Evolved Universal Terrestrial Radio Access (E-UTRA); Physical layer procedures (Release 10)," 3GPP TS 36.213 V10.5.0 (Mar. 2012).

Third Generation Partnership Project, "Technical Specification Group Radio Access Network; Evolved Universal Terrestrial Radio Access (E-UTRA); Physical layer procedures (Release 10)," 3GPP TS 36.213 V10.9.0 (Feb. 2013).

Third Generation Partnership Project, "Technical Specification Group Radio Access Network; Evolved Universal Terrestrial Radio Access (E-UTRA); Physical layer procedures (Release 11)," 3GPP TS 36.213 V11.2.0 (Feb. 2013).

Third Generation Partnership Project, "Technical Specification Group Radio Access Network; Evolved Universal Terrestrial Radio Access (E-UTRA); Medium Access Control (MAC) protocol specification (Release 8)," 3GPP TS 36.321 V8.12.0 (Mar. 2012).

Third Generation Partnership Project, "Technical Specification Group Radio Access Network; Evolved Universal Terrestrial Radio Access (E-UTRA); Medium Access Control (MAC) protocol specification (Release 9)," 3GPP TS 36.321 V9.6.0 (Mar. 2012).

Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.5.0 (Mar. 2012).

Third Generation Partnership Project, "Technical Specification Group Radio Access Network; Evolved Universal Terrestrial Radio Access (E-UTRA); Medium Access Control (MAC) protocol specification (Release 8)," 3GPP TS 36.321 V10.8.0 (Mar. 2013).

Third Generation Partnership Project, "Technical Specification Group Radio Access Network; Evolved Universal Terrestrial Radio Access (E-UTRA); Medium Access Control (MAC) protocol specification (Release 8)," 3GPP TS 36.321 V11.2.0 (Mar. 2013).

Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.16.0 (Dec. 2011).

Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.10.0 (Mar. 2012).

Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.5.0 (Mar. 2012).

Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.19.0 (Mar. 2013).

Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.14.1 (Mar. 2013).

Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.9.0 (Mar. 2013).

Third Generation Partnership Project, "Technical Specification Group Radio Access Network; Evolved Universal Terrestrial Radio Access (E-UTRA); Radio Resource Control (RRC); Protocol specification (Release 11)," 3GPP TS 36.331 V11.3.0 (Mar. 2013).

Third Generation Partnership Project, "Technical Specification Group Radio Access Network; Evolved Universal Terrestrial Radio Access (E-UTRA); Multiplexing and channel coding (Release 10)," 3GPP TS 36.212 V10.5.0 (Mar. 2012).

Third Generation Partnership Project, "Technical Specification Group Radio Access Network; Evolved Universal Terrestrial Radio Access (E-UTRA); Multiplexing and channel coding (Release 10)," 3GPP TS 36.212 V10.7.0 (Dec. 2012).

(56) References Cited

OTHER PUBLICATIONS

Third Generation Partnership Project, "Technical Specification Group Radio Access Network; Evolved Universal Terrestrial Radio Access (E-UTRA); Multiplexing and channel coding (Release 11)," 3GPP TS 36.212 V11.2.0 (Feb. 2013).
Third Generation Partnership Project, "Technical Specification Group Radio Access Network; Evolved Universal Terrestrial Radio Access (E-UTRA); Physical layer procedures (Release 10)," 3GPP TS 36.213 V10.4.0 (Dec. 2011).
Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.4.0 (Dec. 2011).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.4.0 (Dec. 2011).

* cited by examiner

METHODS TO ENABLE SCHEDULING AND CONTROL OF DIRECT LINK COMMUNICATION IN CELLULAR COMMUNICATION SYSTEMS

CROSS REFERENCE TO RELATED APPLICATIONS

This application claims the benefit of U.S. Provisional Application No. 61/653,946 filed May 31, 2012 and U.S. Provisional Application No. 61/793,412 filed Mar. 15, 2013 the contents of which are hereby incorporated by reference herein.

BACKGROUND

Modern cellular wireless communications systems may be designed to offer mobile wireless communications services such as voice and data to subscribers. In a typical communication service, the wireless transmit/receive unit (WTRU) may communicate to the radio access network (or "network") requesting service, which service may then be set-up for the WTRU. The WTRU may use the radio resources allocated by the network to perform the voice call or data transfer. Most services may involve a WTRU and another entity which may be located anywhere where connectivity is available. Voice calls may imply two entities in a different part of the same city, while data services may imply a server located in a different country, for example. Since most calls or data services involve entities in separate geographical locations, modern wireless communications systems may not be optimized for the situation where the communicating parties are separated by a (relatively) short distance.

The recent rise in popularity of smart phones is changing the way people use their wireless devices and how services are offered. For example, location based services are becoming more and more the standard. Likewise, social media applications employing location information are emerging and are expected to become very important in the near future. It is expected that applications and services involving two or more nearby devices may cause large amounts of data traffic in networks. One approach to mitigate the increase in network traffic due to these "Proximity Services" may be to limit the traffic to the cell by either allowing direct WTRU-to-WTRU or device-to-device communications (D2D) or to have an evolved Node B (eNB) relay the information. This last option may reduce the data traffic on the network as the data packets no longer have to be carried to the SGSN and back to the originating eNB, thereby offloading the network.

SUMMARY

A method and apparatus for enabling scheduling and control of direct link communication in a cellular communication system may be disclosed. A method for use in a first wireless transmit/receive unit (WTRU) may include transmitting a request for device-to-device (D2D) communication resources to an enhanced Node B (eNB). The first WTRU may receive an allocation of resources for multiple transmission time intervals (TTI) to be used for D2D communications from the eNB. The first WTRU may schedule D2D communications with a second WTRU to be performed during the allocated resources. The first WTRU may perform D2D communications with the second WTRU using half duplex communications during the allocated resources.

BRIEF DESCRIPTION OF THE DRAWINGS

A more detailed understanding may be had from the following description, given by way of example in conjunction with the accompanying drawings wherein.

DETAILED DESCRIPTION

Figure 1A:
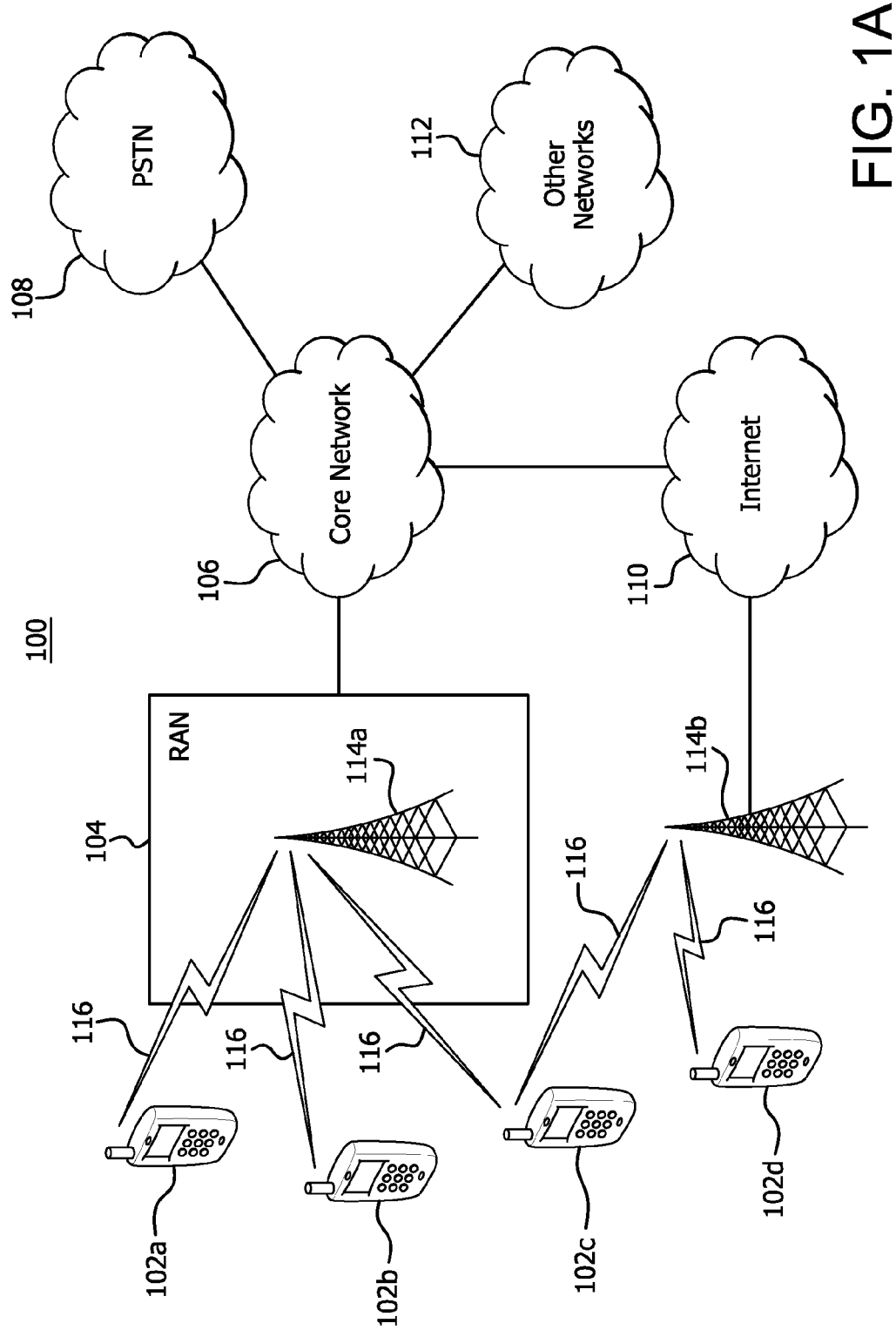
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
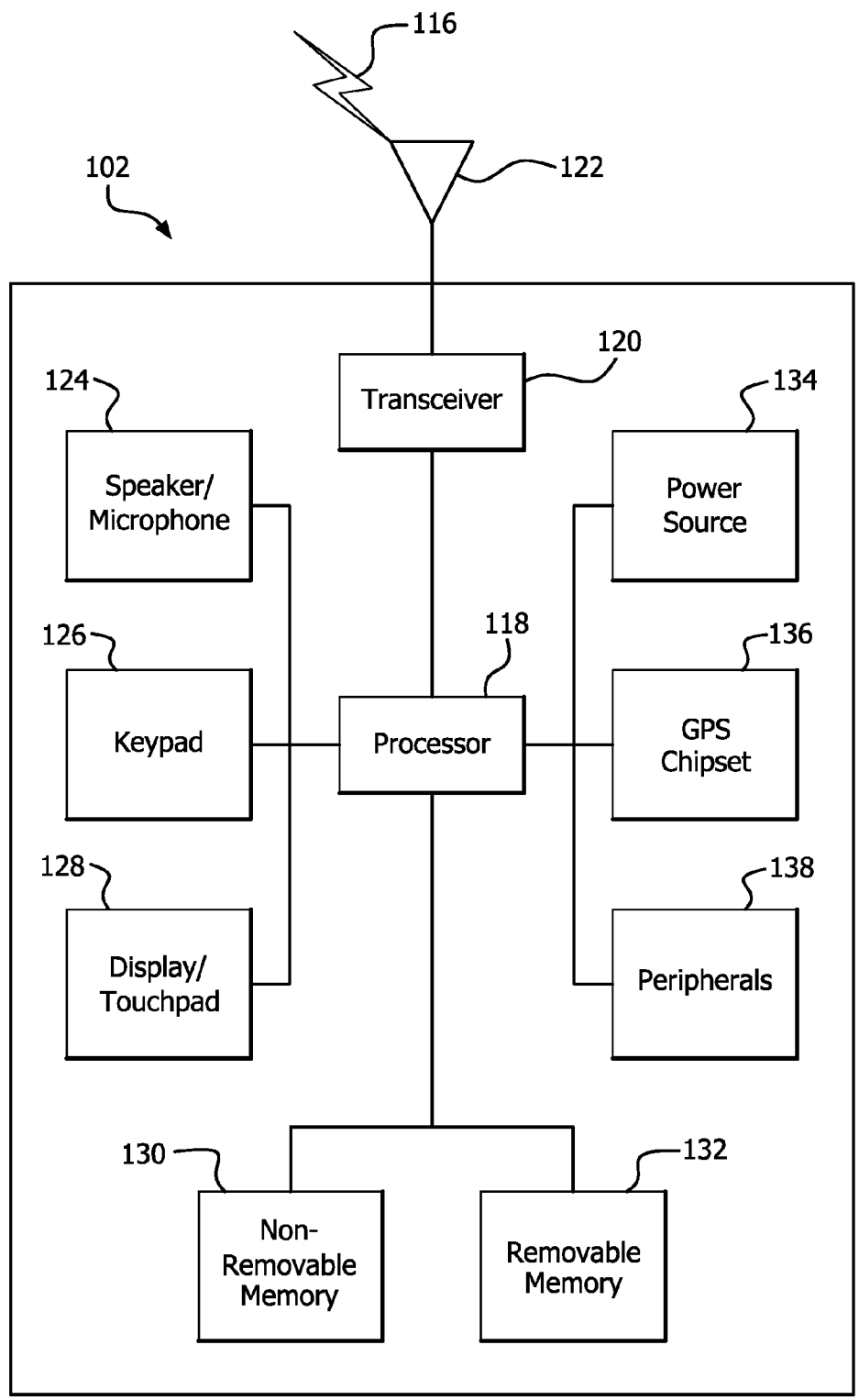
FIG. 1B is a system diagram of an example wireless transmit/receive unit (WTRU) that may be used within the communications system illustrated in FIG. 1A.
Figure 1C:
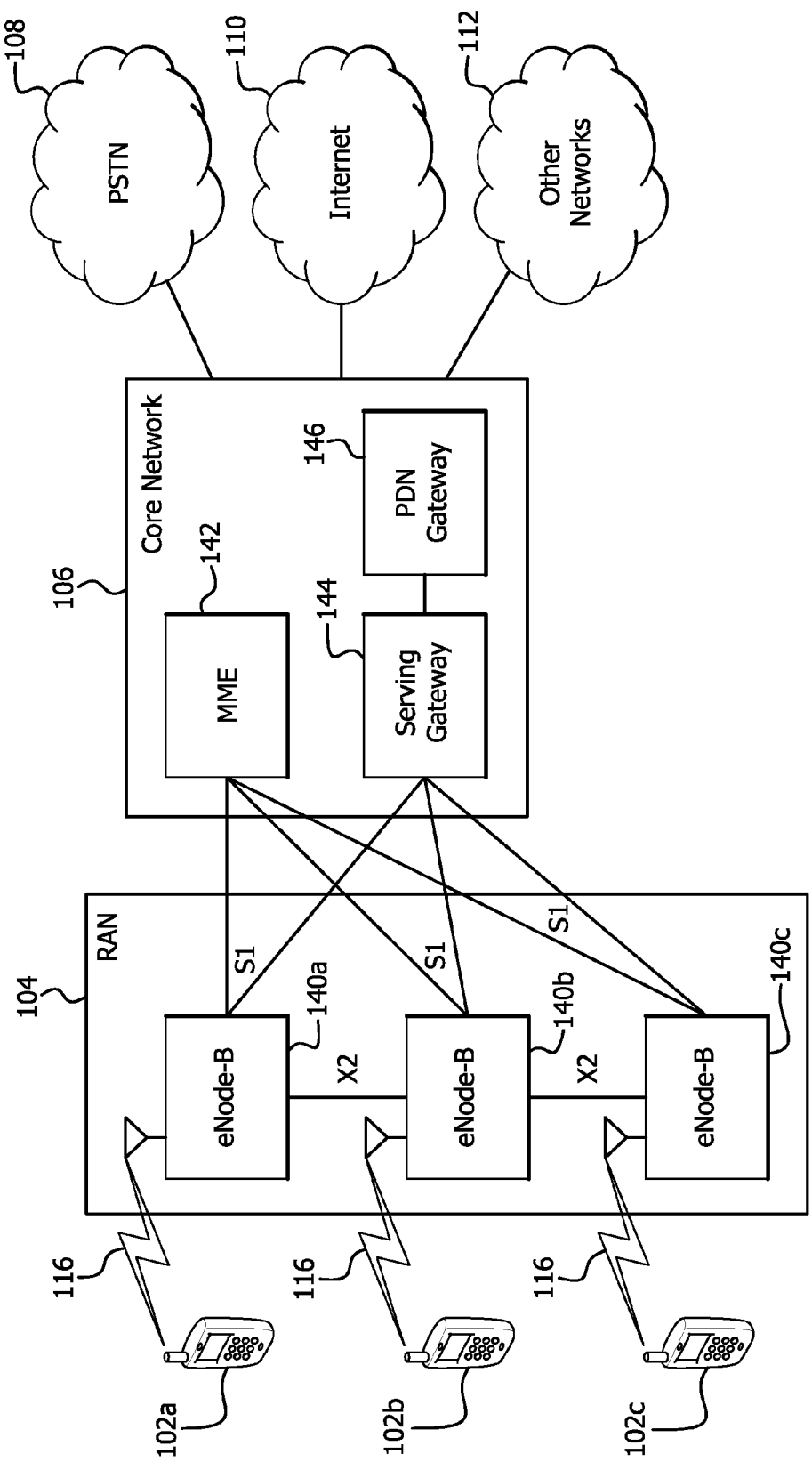
FIG. 1C is a system diagram of an example radio access network and an example core network that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Modern cellular wireless communications such as LTE and HSPA may not have the capability to have direct communication between WTRUs. In these systems, the radio resource is controlled by the network (eNB for LTE and NodeB for HSPA). In cellular wireless communications systems, the control of the radio resource allows for proper system operation. Adjacent cell interference may decrease the system capacity and lead to inefficient bandwidth utilization.

In direct WTRU-to-WTRU or device-to-device (D2D) communications, the WTRUs may use the same frequency band as regular WTRUs. In such cases, the D2D WTRUs, those that are part of a direct WTRU-to-WTRU communication, may need allocated resources to ensure proper system operation.

D2D communications may be aided by the efficient use of radio resources. In modern wireless systems, the scheduler at the base station (eNB, NodeB) may make a decision as to the number of bits, modulation and coding scheme (MCS) and transmit power for the WTRU. Such scheduling decisions may be designed to optimize the radio interface. Another important issue to consider in the design of D2D communications may be the scheduling aspects for direct communications.

In a system where users may be permitted to directly communicate with each other by making use of a shared spectrum controlled by a controlling entity (for example, an eNB), mechanisms to control and allocate resources may be described herein. In addition to resource allocation, mechanisms may be described for scheduling control between the controlling entity and the WTRUs performing direct communications.

A transmitting device or transmitting WTRU may include a device that transmits the data being subject to link adaptation. This transmitting device may also be referred to as transmitting WTRU and transmitting entity.

A receiving device or receiving WTRU may include a device that receives the data being subject to link adaptation. This receiving device may also be referred to as receiving WTRU and receiving entity.

A controlling entity or scheduling entity may be an entity in a device or network node that determines at least one transmission parameter for scheduling purposes.

A traditional link may be the legacy channel ("traditional link") transmission between a network node (eNB) and a device. It may be referred to as a "network link."

A D2D link may be a link/channel connection between at least two WTRUs that may directly communicate, transmit and receive data over a physical wireless medium.

A D2D session may be a logical connection between two or more WTRUs over a D2D link. In case of failure or congestion of the D2D link, the logical connection may be moved, extended, or offloaded to a network link such that data that belongs to the session may be carried using an intermediary network node, for example, an eNB.

A D2D WTRU may be a device or WTRU that participates in a D2D session and/or that is configured for transmission/reception on at least one D2D link.

A D2D data channel may be the channel on the D2D link that carries data information, for example, this channel may take the form of a physical uplink shared channel (PUSCH), physical downlink shared channel (PDSCH), and the like.

A D2D control channel may be a channel on the D2D link that carries control information, for example, this channel may take the form of a physical downlink control channel (PDCCH), enhanced physical downlink control channel (ePDCCH), physical uplink control channel (PUCCH), and the like.

A D2D scheduling subframe may be a time interval, for example, a subframe, 1 ms for LTE, during which a WTRU may decode control signaling for the scheduling of one or more transmissions on a D2D link.

A D2D subframe may be a time interval, for example, a subframe, 1 ms for LTE, during which a WTRU may be scheduled (for transmission and/or reception) for at least one transmission on a D2D link.

Direct communications between WTRUs may occur in multiple ways. As discussed herein, a number of scenarios may be defined to enable the direct communication between two or more end user devices operating in a cellular system controlled by a radio access network. These scenarios are for illustration purposes and it may be understood that the concepts and solutions provided herein are not limited in application to these scenarios. The scenarios are enumerated in terms of the frequency band and/or radio resource used for the D2D communication radio link (D2D link) and based on the basic radio capability of the WTRU in that operating band.

A first scenario may be half duplex utilizing a frequency division duplex (FDD) uplink (UL) band for a D2D link. In such a configuration, a D2D WTRU may be configured to transmit a D2D transmission on the UL frequency of its normal configured FDD (LTE in this example) operations. The D2D transmission may be half-duplex (since it is occurring over a single band).

Figure 2:
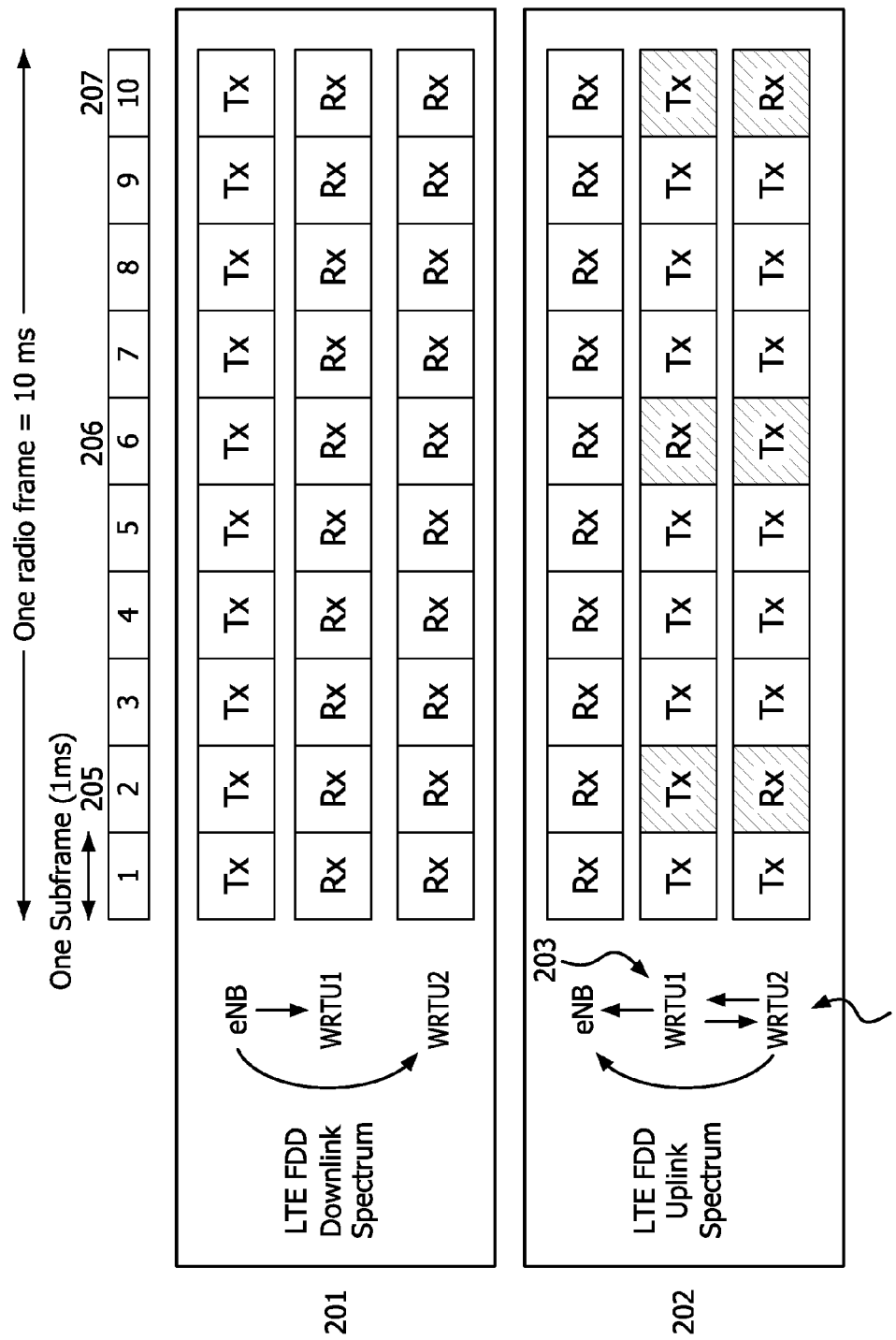
FIG. 2 is an example realization of the half-duplex D2D transmission using the LTE FDD UL band.

FIG. 2 is an example realization of the half-duplex D2D transmission using the LTE FDD UL band. In this example, WTRU1 203 may use UL 202 radio resources in subframes 2 205 and 10 207 to transmit to WTRU2 204, whereas WTRU2 204 may use UL 202 radio resources in subframe 6 206 to transmit to WTRU1 203.

A subframe may include a guard period for transceiver reconfiguration. A guard period may be defined to allow enough time for configuration for reception of the receiving WTRU on the UL band and/or to avoid interference with transmissions from other WTRUs. The guard period may be configured at the end of a subframe preceding a D2D subframe, at the beginning of a D2D subframe (or the first D2D subframe in a set of consecutive D2D subframes), at the end of a D2D subframe (or the last D2D subframe in a set of consecutive D2D subframes), and/or at the end of the subframe following a D2D subframe (or the last D2D subframe in a set of consecutive D2D subframes). In an alternative realization to the sub-frame approach shown in FIG. 2, D2D transmission may be defined on a set of orthogonal frequency division multiplex (OFDM) symbols, on a slot basis (0.5 ms), group of slots, group of subframes or radio frame basis.

The UL PUSCH channel may be used during the D2D subframes for transmission between WTRUs. Alternatively, a new PHY layer channel may be defined to enable direct transmission between devices.

Another scenario may include half duplex utilizing an FDD DL band for D2D link. In such a configuration, a D2D WTRU may be configured to transmit the D2D transmission on the DL frequency of its normal configured FDD (LTE in this example) operations. The D2D transmission may be half-duplex (since it is occurring over a single band).

Figure 3:
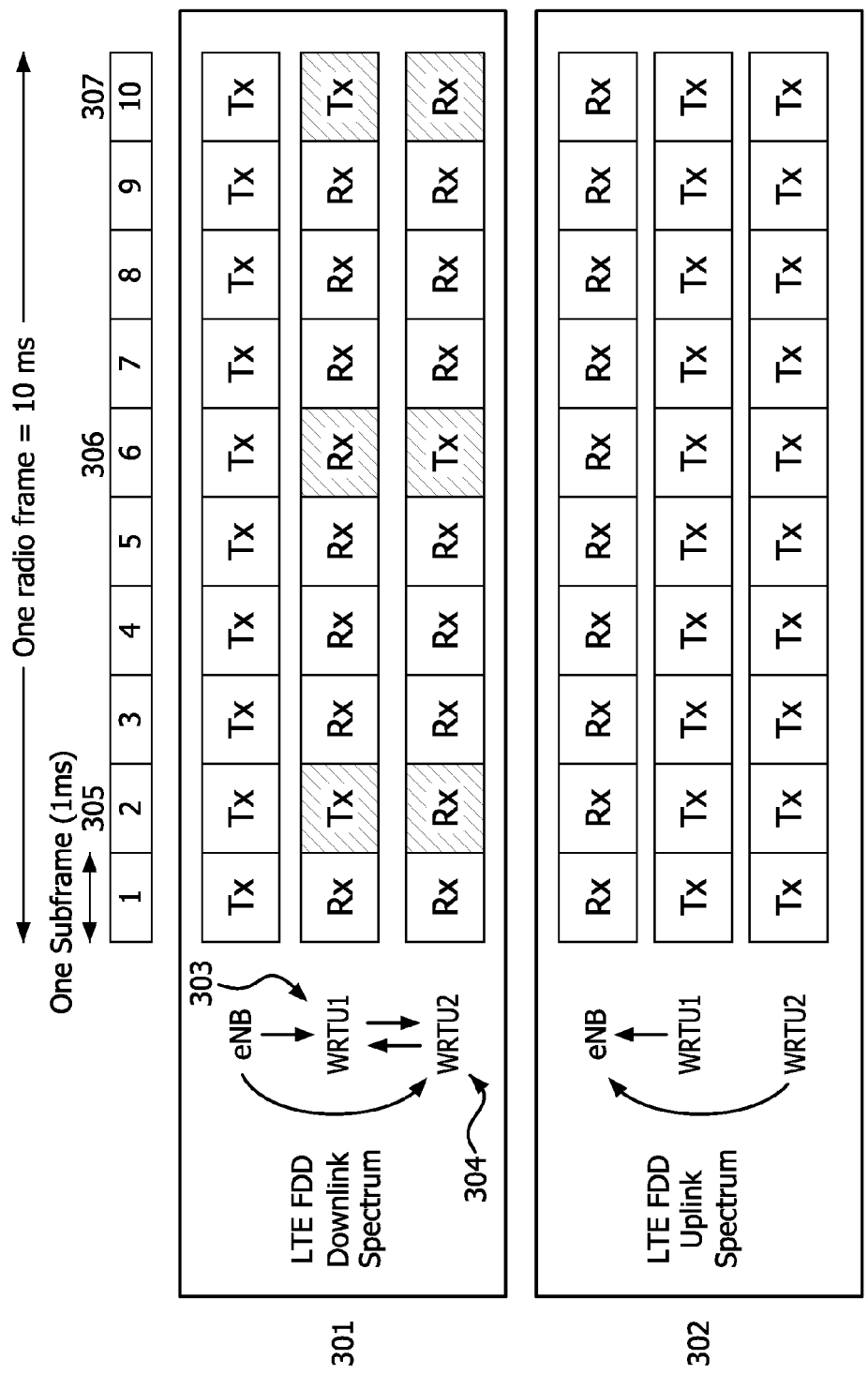
FIG. 3 is an example realization of the half-duplex D2D transmission using the LTE FDD DL band.

FIG. 3 is an example realization of the half-duplex D2D transmission using the LTE FDD DL band. In this example, WTRU1 303 may use DL 301 radio resources in subframes 2 305 and 10 307 to transmit to WTRU2 304, whereas WTRU2 304 may use DL 301 radio resources in subframe 6 306 to transmit to WTRU1 303.

A subframe may include a guard period for transceiver reconfiguration. A guard period may be defined to allow enough time for configuration of transmission by the transmitting WTRU on the DL band and/or to avoid interference with transmissions from the eNB or other WTRUs. The guard period may be configured at the end of the subframe preceding a D2D subframe, at the beginning of a D2D subframe (or the first D2D subframe in a set of consecutive D2D subframes), at the end of a D2D subframe (or the last D2D subframe in a set of consecutive D2D subframes), and/or at the beginning of the subframe following a D2D subframe (or the last D2D subframe in a set of consecutive D2D subframes). In an alternative realization to the sub-frame approach shown in FIG. 3, D2D transmission may be defined on a set of OFDM symbols, on a slot basis (0.5 ms), group of slots, group of subframes or radio frame basis.

The DL PDSCH channel may be used during the D2D subframes for transmission between WTRUs. Alternatively, a new PHY layer channel may be defined to enable direct transmission between devices.

Another scenario may include full duplex utilizing FDD DL and UL for D2D Link. In this scenario, a D2D WTRU may be configured to transmit the D2D transmission on the both the UL and DL frequency of its normal configured FDD (LTE in this example) operations. The D2D transmission may be full-duplex in this scenario implying that one of the WTRUs in the D2D link may invert its UL and DL frequencies.

Figure 4:
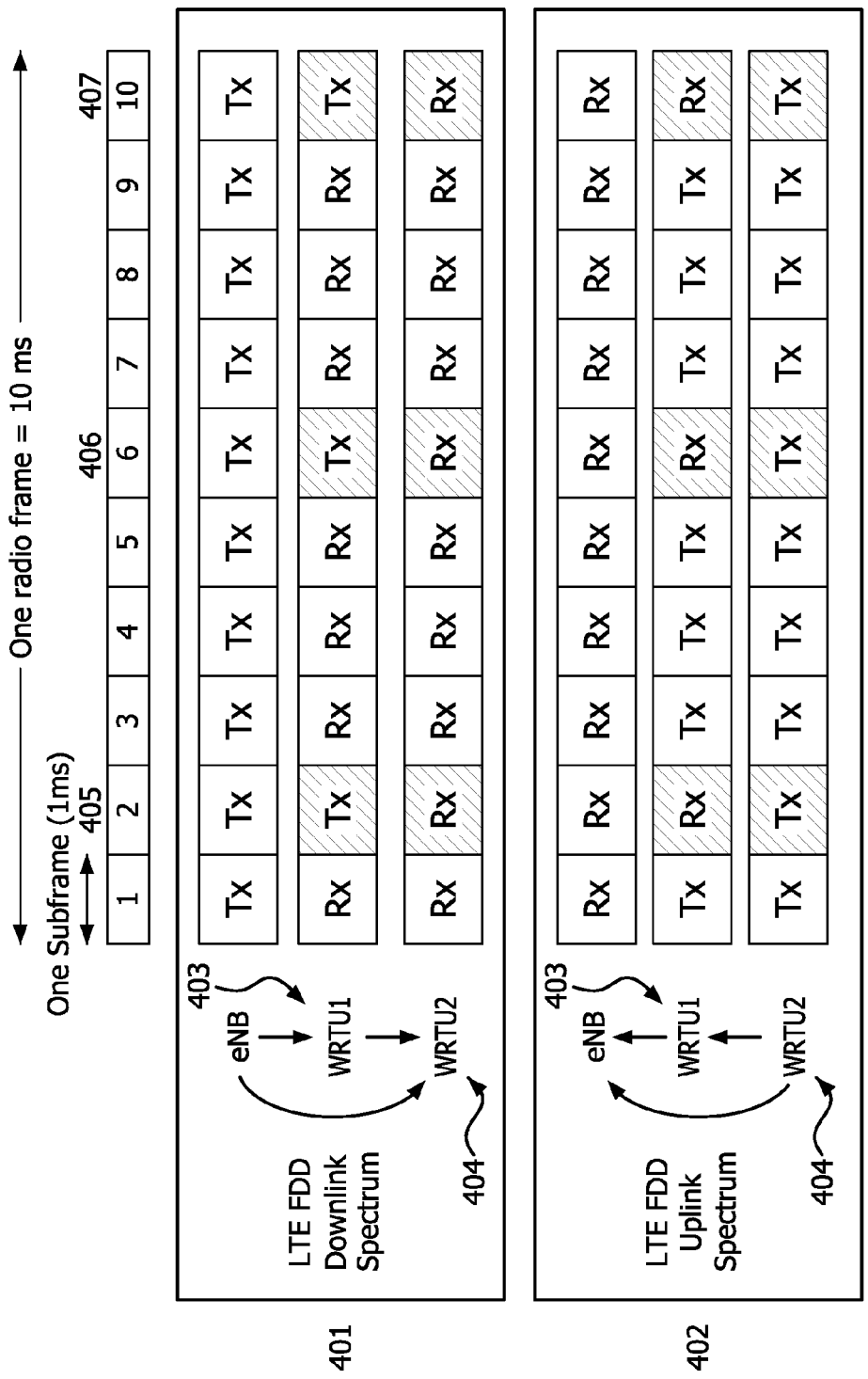
FIG. 4 is an example realization of the full-duplex D2D transmission using the LTE FDD DL and UL bands.

FIG. 4 is an example realization of the full-duplex D2D transmission using the LTE FDD DL and UL bands. In this example, WTRU1 403 may use DL 401 radio resources in subframes 2 405, 6 406 and 10 407 to transmit to WTRU2 404, whereas WTRU2 404 may use UL 402 radio resources in subframes 2 405, 6 406 and 10 407 to transmit to WTRU1 403.

A subframe may include a guard period for transceiver reconfiguration. A guard period may again be used and may be defined to allow enough time for configuration of transmission and reception functions during the D2D subframes and/or to avoid interference with transmissions from the eNB or other WTRUs. The guard period may be configured at the end of the subframe preceding a D2D subframe, at the beginning of a D2D subframe (or the first D2D subframe in a set of consecutive D2D subframes), at the end of a D2D subframe (or the last D2D subframe in a set of consecutive D2D subframes), and/or at the beginning of the subframe following a D2D subframe (or the last D2D subframe in a set of consecutive D2D subframes). In an alternative realization to the sub-frame approach shown in FIG. 4, D2D transmission may be defined on a set of OFDM symbols, on a slot basis (0.5 ms), group of slots, group of subframes or radio frame basis.

The DL PDSCH and UL PUSCH channels may be used during the D2D subframes for transmission between WTRUs. Alternatively, new PHY layer channels may be defined to enable direct transmission between devices.

Another scenario may include half duplex utilizing a TDD LTE Spectrum. In this scenario, D2D transmission may be configured to take place over the TDD LTE spectrum. The D2D transmission may be half-duplex (since it is occurring over a single band).

Figure 5:
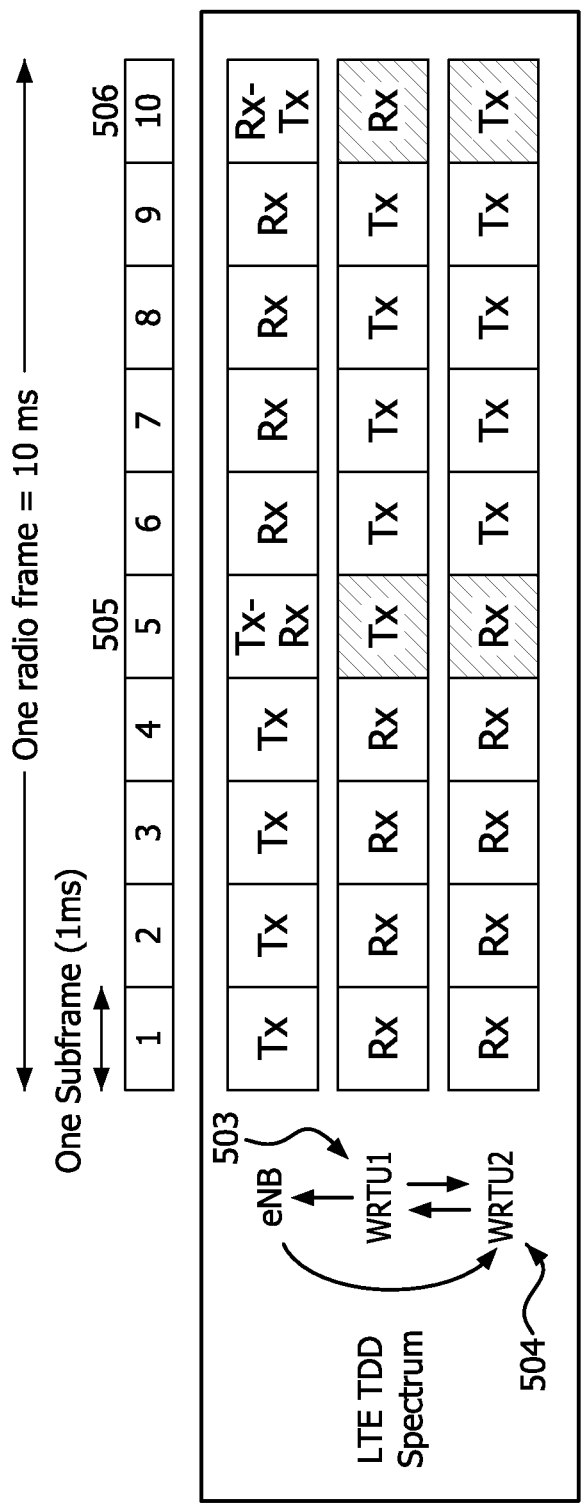
FIG. 5 is an example realization of the D2D transmission using LTE TDD spectrum.

FIG. 5 is an example realization of the D2D transmission using LTE TDD spectrum. In this example, WTRU1 503 may transmit to WTRU2 504 in the special subframe #5 505, whereas WTRU2 504 may transmit to WTRU1 503 in the special subframe #10 506. A D2D transmission may not be limited to TDD special subframes.

The mechanisms described herein may be applicable but may not be limited to the scenarios described above.

A WTRU may participate in D2D communication if it is capable of such type of communication, and if configured for such type of operation. If a WTRU is capable of D2D communications, it may acquire such configuration. The WTRU may receive at least part (or all in case of centralized control) of such configuration from a network node (for example, an eNB, a centralized controller for D2D communications, or the like) or it may receive at least part (or all in case of distributed control) from another WTRU (for example, a master for the link/session).

A distinction may be made between aspects related to parameters for resource allocation and parameters as well as methods for scheduling of D2D transmissions. More specifically, a D2D-capable WTRU may acquire those aspects using the same method for a given D2D link (or session), for example, dynamically using a single control channel, such as an (e)PDCCH. Alternatively, a D2D-capable WTRU may acquire those aspects using different mechanisms, for example, resource allocation may be pre-configured by RRC while scheduling parameters may be dynamically provided on a control channel. Additionally, the methods by which a WTRU may acquire such configuration aspects may differ for a given D2D link (or session) as a function of the WTRU's role, for example, whether the WTRU intends to transmit on the D2D link, or receive the D2D session.

The configuration may include parameters related to the allocation of physical radio resources. For example, the physical radio resources may be a frequency band, a carrier frequency, one or more set(s) of physical resource block(s) and/or related timing aspects, such as D2D subframe configuration and/or D2D scheduling subframe configuration. Such resources may correspond to resources otherwise used for network communications, for example, resources of a cell. A resource allocation may be applicable to a D2D link, and/or to one or more control channel(s) related to D2D operation.

The configuration may include parameters related to the acquisition and monitoring of control channels. Such parameters may include resource allocation for the corresponding channel. Such parameters may include a timing configuration for the corresponding channel.

Such control channels may be used for scheduling of transmissions on a D2D link by a controlling entity (for example, by a network node or by a controlling WTRU), or for arbitration of resources in case of a distributed system. For example, such control channels may include assignment(s) of resources for reception of a D2D transmission, grant(s) of resources for transmission on a D2D link, corresponding scheduling parameters and/or arbitration of the access to the medium. For example, if (e)PDCCH (or similar) is used, the WTRU may receive a subframe configuration for a D2D scheduling subframe and/or a RNTI for a given D2D link (or for a session of the D2D link).

A plurality of control channels may be configured. Such control channel(s) may carry uplink control information. For example, the uplink control information may be a scheduling request (SR), buffer status reporting (BSR), hybrid automatic repeat request (HARQ) positive acknowledgement/negative acknowledgement (ACK/NACK) feedback, channel quality indicator (CQI), and the like.

The configuration may include scheduling parameters such as a session identity, a WTRU identity, a modulation and coding scheme (MCS), a HARQ process identity, or the like.

A number of selected parameters that may be applicable to the different configuration aspects described above may be provided herein.

A WTRU may be configured with a D2D link. A D2D link may carry transmission(s) for one or a plurality of D2D session(s). A D2D link (or session) may be associated with one (or more) resource allocation or one (or more) control channel resource, for example, (e)PDCCH, PUCCH. A D2D link (or session) may be associated with a D2D subframe configuration and/or a D2D scheduling subframe configuration. For example, such subframe configuration may be received as a bitmask for a given radio frame with periodicity X satisfying system frame number (SFN) mod X=0. A D2D scheduling subframe may be determined by a fixed timing relationship form the D2D subframe, for example, 4 ms before the D2D subframe, or vice-versa.

A D2D link (or session) may be associated with one (or more) identity, where such identity may correspond to a radio network temporary identity (RNTI) (for example, for decoding of control signaling for scheduling of D2D transmissions), or to a codepoint (for example, as a field inside control signaling for scheduling of D2D transmissions, such as the control format indicator (CFI) field). The D2D link (or session) may be configured with a parameter that may be used by the WTRU to determine a session- or link-specific search space in a control region for (e)PDCCH decoding.

A D2D link (or session) may be associated with QoS parameters. For example, a D2D session may be associated with a Guaranteed Bit Rate (GBR), a Maximum Bit Rate (MBR), a Prioritized Bit Rate (PBR), maximum delay time (for example, a discard timer) and/or a QoS Class Indicator (QCI). The D2D link (or session) may be associated with an indication of whether or not offloading through the network is possible for the concerned D2D session. Such parameters may be WTRU-specific and configured for a transmitting WTRU.

Different embodiments may be described by which a WTRU may receive different configuration aspects.

A D2D WTRU may receive at least part of the configuration for a D2D link on cell-specific signaling. Such signaling may be a SystemInformationBroadcast (SIB) element on the system information broadcast of a cell. A D2D WTRU (either in CONNECTED or in IDLE mode) may acquire the D2D SIB.

In a first example (realization A), the D2D SIB may include a configuration of scheduling occasions for a broadcast channel for D2D information in the cell (such as a D2D information shared channel (DISCH)) and its associated RNTI (for example, D2D-RNTI).

In a second example (realization B), the D2D SIB may include a configuration of scheduling occasions for a D2D link in the cell as well as a configuration for resource allocation for the D2D link. In particular, this may be used with a distributed approach with WTRU-controlled scheduling and distributed arbitration.

In a third example (realization C), the D2D SIB may include a configuration of scheduling occasions for a D2D link in the cell, a configuration for resource allocation for the D2D link as well as an RNTI for further scheduling of D2D transmissions (for example, D2D-RNTI). In this case, the WTRU may decode (e)PDCCH using D-RNTI in the common search space. In particular, this may be used with an approach based on WTRU-controlled scheduling and network-assisted centralized arbitration principles.

In a fourth example (realization D), the D2D SIB may include a configuration of scheduling occasions for a D2D link in the cell, a configuration for resource allocation for the D2D link as well as a RNTI for further scheduling of D2D transmissions (for example, D2D-RNTI) and a virtual identity to derive the search space associated to the D2D link. In particular, this may be used with an approach based on WTRU-controlled scheduling and network-assisted centralized arbitration principles.

At least part of the configuration of a D2D link may be received on a shared channel dedicated to D2D configuration and information (DISCH). A WTRU may acquire such channel and receive one or more sets of configuration parameters, for example, one for each D2D link (and/or session). A D2D WTRU (either in CONNECTED or in IDLE mode) may acquire the DISCH. If security is applied to the DISCH, a WTRU in CONNECTED mode may acquire the channel, or alternatively a WTRU in IDLE mode with the proper security configuration (for example, as acquired during a discovery procedure) may acquire the channel.

In a first example (realization A), such set of configuration parameters may include a configuration of scheduling occasions for the concerned D2D link (or session) in the cell, a configuration for resource allocation for the D2D link (or session) as well as an RNTI for further scheduling of D2D transmissions (for example, D2D-RNTI) for the D2D link (or session). The WTRU may receive a virtual identity to derive the search space associated with the D2D link and/or a session identity.

At least part of the configuration of a D2D link may be received by dedicated signaling. For example, the WTRU may receive at least part of a D2D configuration as RRC signaling as part of, for example, an RRC Connection Reconfiguration.

In one example (based on realization B/C/D above with centralized scheduling), a WTRU may receive, by dedicated scheduling, an RNTI for scheduling of D2D transmissions for a concerned link (or session). In particular, if the WTRU is connected to the network and is a transmitting WTRU of the D2D session.

In one example (realization E), the WTRU may receive all relevant configuration by dedicated scheduling.

In order to allow D2D communication, the resources used by D2D links may be either shared between LTE traditional link transmissions and D2D links or a different frequency/band may be allocated and used for D2D communications.

The resources used for D2D transmissions over the air interface may be under the network control and configuration. The scheduling functionality controls the allocation of the shared resources amongst traditional link users, amongst D2D users, and amongst traditional link users and D2D users. Interference between users under the same eNB coverage or users between different eNB coverage may be minimized and controlled by the scheduler.

The network may control (for example, configure and/or schedule) the allocation of resources for D2D transmissions (such as, transmissions between WTRUs on a D2D link) and for transmissions between WTRUs and the eNB (such as, transmissions on the network link). For example, the network may control allocation of resources for D2D transmissions using the resources of a given cell via one or a combination of frequency division multiplexing (for example, RBs may be reserved for D2D links and traditional link WTRUs), time division multiplexing (for example, D2D links and traditional links may transmit in different subframes), code division multiplexing, and spatial multiplexing.

Multiple methods that may be used to perform resource allocation from the network are described below.

Configuration of the allocation of D2D resources for D2D transmissions.

One purpose of resource allocation in the context of D2D operations may be to configure D2D WTRUs with the radio resources for D2D transmissions. Such configuration may be applicable for a given D2D session and/or for a given D2D link (supporting one or more D2D session(s)).

The radio resources may include a set of subframes, for example, one or more D2D subframe(s), a set of OFDM symbols, a set of subcarriers (or number of carriers Nc), a set of resource blocks, and/or a set of carriers. While the term "set" was used above, it may be understood that "'set" may be of any size, and include one or all elements. In general, one purpose of radio resource allocation is to ensure proper utilization of the radio resource and to control the interference.

D2D resource allocation by parameterization based on time, maximum allocation, start offset from data region of a cell's resources, and maximum power allowed may be described herein.

In the mechanisms described, the resource allocation may include the actual resources that a transmitting WTRU may use at the scheduled time and/or a maximum allocation that the WTRU may use to perform transmission, if necessary, and if enough data and power are available in the WTRU. One example may be the maximum bandwidth, such as Nc, that the WTRU may use. A base offset subcarrier indication may need to be provided to the WTRU to know where to start. The actual bandwidth may be decided by the WTRU (based on power and TB size). By way of a second example, maximum power may be set by the RAN where the WTRU uses a determined transmission power or autonomously adjust the power within a maximum power requirement.

D2D resource allocation may be a function of an indexed table, an offset in frequency and a size of the resource allocation. A resource allocation may include an indication of the number of PRB(s). For a given D2D link (or session), a WTRU may be configured with at most one active set of resources for D2D transmissions. For a given resource configuration, each resource may be indexed (for example, by a resource index) over a given period of length (for example, 10 ms radio frame, or a multiple thereof) and spread across the D2D subframes. The D2D resource with the lowest index in a given D2D subframe may be indicated as an offset number of PRB(s).

For a given link (or session), there may be at most one resource per D2D subframe. Alternatively, frequency multiplexing may be used in a given subframe as a function of a density parameter that spreads resources over the total set of PRBs. In this case, for example resources in a given D2D subframe may be indexed using fewer bits. Alternatively, in this case, for example, indexing may be for all resources across all the D2D subframes for the given time period. The WTRU may receive control signaling that may use indices to address some of the resources individually, such that the allocation for a transmission within a D2D subframe may be dynamically changed when received with other scheduling information, or alternatively activated and deactivated by the control signaling.

The set of resource allocations may be represented by a configuration index, a frequency offset, and a PRB size. The configuration index may indicate which of a finite possible configuration is used to determine the set of consecutive PRBs available in a cell, as a function of the frame structure of the cell. For example, a configuration index may indicate that for any system radio frame matching SFN mod X=0, subframes #4, 5, 6, 7 may each correspond to a D2D subframe where X thus corresponds to a periodicity of the resources as integer multiple of 10 ms. The frequency offset may be used to indicate the first PRB of the D2D resource allocation in a given subframe, such as the first PRB of the "PRB size" PRBs of the D2D resource. The resource allocation may include a parameter density that enables frequency multiplexing. Frequency multiplexing may be performed as a function of the number of DL to UL switching point for frame structure 2.

Alternatively, frequency multiplexing may be performed as a function of the number of D2D subframes within a given period X (for example, a radio frame, or a multiple number of radio frames) and the desired density which may represent the number of D2D subframes for the given period X or a parameter to a function that spreads additional D2D resources in the D2D subframes of the concerned period X. For example, the WTRU may first determine the number of D2D resources (such as a fixed set of PRBs) in a given subframe for the given period X (for example, a 10 ms radio frame) by identifying what subframes may contain at least one D2D resource (for example, a subset of subframes 0 . . . 9 of the radio frame). The WTRU may then determine the number of resource allocation(s) for the concerned period as a function of a density, for example, a number of occasions for the concerned period. The WTRU may finally determine the number and start location of D2D resource(s) for each such subframe as a function of an offset. The WTRU may do so by allocating resources starting at the PRB index corresponding to n*offset value up to the maximum number of PRBs for the cell less the size of the fixed set of PRBs for a D2D resource, and determining which assignment may be performed sequentially for each subframe of the set of D2D subframe up to the corresponding density. Any one of the set of D2D subframes, the density, or the frequency offset may be, for example, either a configuration aspect or a signaling aspect.

The resource allocation may include the resources on which a D2D WTRU receives and decodes D2D transmissions. Such resource allocation may represent a subset of the cell's resources, where resources may be addressed based on the indexing of physical resource blocks. Such indexing may be relative to the total number of PRBs for the cell. For example, this may be used in the case where dynamic resource allocation is performed across all resources of the cell. Alternatively, such indexing may be relative to the start of a subset of PRBs of a cell which subset may be allocated to a D2D link. For example, the eNB may allocate a subset of the cell's resources to a D2D link according to a sandbox principle (described in further detail below), such that dynamic scheduling may be performed within the subset of resources enabling indexing relative to the set of resources.

The following sections describe solutions for resource allocation, multiplexing and transmission scheduling of D2D and traditional link WTRUs. It may be understood that the methods described herein are also applicable in the case where no network coverage is available and resource allocation and scheduling are performed by the WTRUs in the system seeking D2D communications. Additional coordination mechanisms between eNBs may be considered to minimize inter-cell interference in situations where UL macro WTRU in a second eNB may be interfering with a D2D receiving WTRU. The coordination mechanism may be realized using an X2 protocol or interface between the two or more eNBs.

The embodiments described below may be used by themselves or in combination. For example, a WTRU configured with such subset of resources may receive control signaling (either L1 on, for example, PDCCH or ePDCCH, L2 on, for example, a MAC control element (CE), or L3 (for example, RRC)) that re-allocates the subset of resources according to any of the embodiments described below. For example, it may be useful for the network to move the resources allocated to a D2D link when scheduling and performing link adaptation for transmissions for WTRUs in a cell which transmissions are not part of the D2D session. The resource allocation methods described below may be combined with any of the scheduling methods described below.

Semi-static resource allocation may be described herein.

A sandbox principle (such as a session having dedicated resources, for example, in time and/or frequency) may be used. With this method, the eNB may remain in control of the resource allocation to be used between WTRUs in a given D2D link, but the resources may be given to the WTRUs in a semi-static manner.

The WTRU may have scheduling flexibility of when and how to use those resources, including the transmission scheduling time and the transmission parameter selection and scheduling. For example, transmission scheduling time may include the WTRUs in the D2D link deciding and scheduling transmissions in the provided resources. For example, the transmission parameter selection and scheduling may include the WTRUs in the D2D link deciding the transmissions selection parameters.

In a semi-static resource allocation mechanism, the eNB may use a fast activation/deactivation mechanism to trigger the WTRUs in a D2D link to initiate transmission reception on a pre-configured set of resources. In addition, the eNB may provide the transmitting D2D WTRU with the maximum amount of resource usage for transmission on the provided link. Once the maximum amount of resource usage is exceeded the WTRU may stop transmitting on a D2D link. The resource usage may be defined in terms of the amount of data that is transmitted, the number of TTIs, or the number of resource blocks used for transmission.

With this method, a WTRU may receive a semi-static resource allocation. The WTRU may receive semi-static transmission parameters (referred to as scheduling parameters) for the corresponding resource allocation. Alternatively, the WTRU may autonomously determine what transmission parameters to apply, or select one of a finite number of set(s) (that may be configured) of transmission parameters. In any case the WTRU may receive dynamic control scheduling that provides at least some of the transmission parameters for the concerned resource allocation, which parameters may override the WTRU-selected (if any), or network-configured (if any) transmission parameters.

Semi-persistent resource allocation in which resources are configured apriori and may be activated/deactivated may be used. With this method, a WTRU may receive a semi-persistent resource allocation. The WTRU may subsequently receive control signaling that activates the resource allocation. The WTRU may receive semi-persistent transmission parameters for the corresponding resource allocation, for example, in the control signaling, that activates the resource allocation. Alternatively, the WTRU may autonomously determine what transmission parameters to apply, or select one of a finite number of set(s) (that may be configured) of transmission parameters. In any case, the WTRU may receive dynamic control scheduling that provides at least some of the transmission parameters for the concerned resource allocation, which parameters may override the WTRU-selected (if any) or network-configured (if any) transmission parameters.

Alternatively, a WTRU may be configured with a plurality of sets of resource allocation. For example, such configuration may be received from L3 signaling. Such configuration may be specific to a D2D link. Each set may be indexed (for example, 0, 1, 2 and 3 for a configuration with 4 sets) such that a D2D WTRU configured with the corresponding link may receive control signaling that contains an index.

The WTRU may receive the index of the set of resources applicable to the D2D link via an activation signaling, (for example, received by L1 PDCCH/ePDCCH, L2 MAC or L3 RRC, etc.). A D2D WTRU may receive control signaling, for example, that activates a given set as indicated by the received index. In such case, the D2D WTRU may use the corresponding resource allocation as a function of the reception time of the (de-)activation signaling according to at least one of the following: after a fixed time, the first D2D subframe (e.g., no earlier than after a fixed delay), the first D2D scheduling occasion (e.g., no earlier than after a fixed delay), or in a subframe offset in time as determined from the received activation signaling. The WTRU may use the resources until further control signaling is received (for example, upon deactivation of the concerned resource or selection of a different set of resources), or until some validity time has expired (for example, the validity period of a resource may be limited and restarted upon reception of control signaling that activates the resource allocation), or until some error condition (for example, radio link failure (RLF) is declared for the D2D link) invalidates the resource allocation.

The WTRU may receive the index of the set of resources via scheduling, (for example, in a DCI that schedules one (or more) D2D transmission received by L1 PDCCH/ePDCCH, L2 MAC or L3 RRC, and the like). A D2D WTRU may receive control signaling, for example, that schedules at least one D2D transmission(s) and that include an index to the applicable set of resources. With this method, a WTRU may receive multiple resource allocations. Each resource allocation may be controlled according to a different methods, such as any of the methods described herein. In any case, the WTRU may receive dynamic control scheduling that provides at least some of the transmission parameters for the concerned resource allocation, which parameters may override the WTRU-selected (if any) or network-configured (if any) transmission parameters.

A WTRU may receive control signaling that activates or deactivates at least one set of resources. In such case, the D2D WTRU may activate or deactivate the use of the corresponding resource allocation as a function of the reception time of the (de-)activation signaling according to at least one of the following: after a fixed time, the first D2D subframe (for example, no earlier than after a fixed delay), the first D2D scheduling occasion (for example, no earlier than after a fixed delay), or in a subframe offset in time as determined from the received activation signaling.

WTRU-specific activation/deactivation may implicitly indicate the role of a WTRU. The activation/deactivation may be used to implement resource arbitration. For example, a resource may be activated for transmission for one WTRU at any given time, while for other WTRUs in the D2D session may be activated for reception. In this case, the concerned WTRU(s) may implicitly determine whether the received control signaling for scheduling (if any) for a given D2D subframe is for a grant (transmission) or for an assignment (reception).

Alternatively, activation/deactivation may be used to move the resources used for a D2D session to another region of the scheduler's resource map, to improve system throughput when performing link adaptation for transmissions that are not for a D2D link.

In dynamic resource allocation, no resource allocation may be configured and a resource may be dynamically assigned. A D2D WTRU may monitor downlink control channels from the eNB (for example, in a D2D scheduling subframe) for a resource allocation applicable in a given subframe. The timing between the reception of the control signaling (for example, the D2D scheduling occasion in subframe n) and the corresponding D2D transmission (for example, in subframe n+k) may be determined according to at least one of the following. k may be a fixed value, (such as representing a fixed timing relationship from the reception of the PDCCH or ePDCCH or any other control signaling from the eNB). k may be a variable value that corresponds to, for example, a predefined function, a subsequent D2D subframe such as the next configured D2D subframe or the first D2D subframe no earlier than subframe n+y where y represents a fixed delay, for example, for the purpose of allowing sufficient processing time, or the like.

An eNB may perform dynamic per TTI scheduling of transmissions over the D2D link (for example, controlling the transmission parameters of WTRUs). Alternatively, an eNB may provide resource allocation and at least one WTRU in the D2D communication may have the autonomy to determine the final transmission selection parameters and perform some scheduling functionality. The eNB may have full control of the resources and control interference between D2D WTRUs and between serving cell WTRUs (for example, macro WTRUs).

A resource allocation may be valid for multiple transmissions in consecutive subframes. A resource allocation may be configured for transmission bundling, including the size of the bundle. Alternatively, scheduling information may indicate that bundling may be used for the transmission.

When bundling is configured, activated, and/or scheduled for a D2D transmission, the WTRU may perform a bundled transmission on a resource allocation by invoking the same HARQ process for each of the transmission of the bundle, up to the size of the bundle. In a first example, the WTRU may perform each of the D2D transmissions for the HARQ process in consecutive D2D subframes available to this HARQ process, where D2D subframes are a function of the D2D subframe configuration and may (or may not) represent consecutive subframes from the perspective of the system. In a second example, the WTRU may perform each of the D2D transmissions for the HARQ process in consecutive subframes starting from the first available D2D subframe for this HARQ process.

Within the bundle, HARQ retransmissions may be non-adaptive and triggered without further control signaling (for example, either scheduling or feedback). For bundling and D2D transmissions, a WTRU may be configured to transmit a single bundle for a given transport block. In such case, the WTRU may assume that the last transmission of the bundle is positively acknowledged, if the use of HARQ feedback is not configured. Alternatively, a WTRU may be configured to perform retransmission of a bundle, in particular if the use of HARQ feedback is configured.

For a WTRU that receives a D2D transmission that is part of a bundle, and if feedback is configured, the WTRU may transmit feedback at the first occasion upon successful decoding, or at the first occasion following the subframe that corresponds to the last transmission of the bundle.

The validity of a resource allocation may be bounded in time. For example, the WTRU may release the configuration upon expiration of a timer (for example, a dedicated validity timer, or timing advance timer (TAT)), absent any event that may restart the timer. Such event may include reception of a message that configures (or re-confirm) the resource allocation, that activates the resource allocation, that schedules a transmission in the concerned resource allocation.

The validity of a resource allocation may be revoked upon certain events. For example, the WTRU may release the configuration upon a failure event, for example, such as the quality of the D2D link below a certain threshold (for example, configurable) and for a certain amount of time (for example, configurable), such as the WTRU detecting (for example, on DL) radio link failure for the cell associated to the D2D resources, such as mobility event (or a failure thereof), or the like.

The criterion for releasing the configuration may be a function of the role of the WTRU in a D2D session. For example, some criterion may be applicable for a WTRU that is configured to transmit on the D2D link (for example, for WTRUs configured to transmit uplink control information (UCI)) DL radio link monitoring (RLM), loss of uplink synchronization (for example, TAT expiry for a CONNECTED WTRU), or the like.

Embodiments for HARQ processes for a D2D link may be disclosed hereafter. A D2D WTRU may be configured with one HARQ entity per D2D link (or per D2D session). Such HARQ entity may be configured with separate processes for D2D reception and for D2D transmissions. The number of HARQ processes may be a configuration aspect of the D2D link.

HARQ processing for D2D transmissions may be referred to as UL HARQ hereafter. A WTRU may have a fixed number of UL HARQ processes for the HARQ entity (for example, configured). The number of HARQ processes for transmission on the D2D link, for example, may be a function of the required QoS of a WTRU in the session.

UL HARQ processes for D2D may be asynchronous. If there is more than one process, each HARQ process may be associated with an identifier. For example, the WTRU may receive control signaling (either arbitration signaling and/or a grant for the D2D link) that indicates that it may perform a transmission, for example, in the next D2D subframe, which signaling indicates what UL HARQ process to invoke for the (re-)transmission.

Alternatively, a UL HARQ process may be synchronous. In a first example, a transmitting D2D WTRU may be assigned with a HARQ process in a synchronous manner, where for example every occurrence of a resource corresponds to the concerned HARQ process. In this case, the identification of the process may be implicit, and may be based on the assigned D2D subframe(s) and/or resource in the concerned subframe (if multiple). For example, the WTRU may be assigned with a mask index that determines what resources for the resource allocation of the D2D link synchronously corresponds to the HARQ process(es).

It may be useful to implement implicit resource arbitration whereby WTRUs synchronously transmit on different resources as part of the resource allocation and D2D subframe configuration. Alternatively, arbitration of the resources may be separate, and may be included in the control signaling for scheduling.

If there is a single UL HARQ process for the HARQ entity, the WTRU may perform transmission of transport blocks in sequence. In a first example, if bundling is configured but HARQ feedback is not configured, a WTRU may have a single HARQ process and toggle the new data indicator (NDI) for every bundle. In a second example, if bundling is not configured but HARQ feedback is configured, a WTRU may have a single HARQ process and perform retransmission up to the maximum number of HARQ transmissions or until it receives a positive acknowledgement as well as scheduling for a new transport block (for example, NDI may be set).

If the use of HARQ feedback is configured, a transmitting WTRU may determine whether or not a retransmission may be performed based on an indication in the control signaling for scheduling. Similarly, a DL HARQ process may be either synchronous or asynchronous, based on similar methods as described for the UL processes.

For each of the resource allocation mechanisms described above, a number of scheduling schemes may be applied. Scheduling may refer to, but is not limited to, one or a combination of the following: a decision to transmit or not transmit in a given resource, RB assignment and resource hopping assignment, transmission parameter selection or link adaptation, carrier indication, power control information (for example, TPC), pilot information (for example, DM-RS cyclic shift and OCC index or other pilot-related parameter), subframe(s) for which the transmission scheduling or grant is valid, validity period (for example, in terms of number of subframes), control information request (for example, a request for CSI information, buffer information, SRS transmission), frequency band, FDD frequency (for example UL or DL frequency), HARQ information including HARQ process number and HARQ control information (for example, flush HARQ buffer, new data, and the like), and identity. For example, the transmission power selection or link adaptation may include one of the following: modulation scheme, coding rate, transport block size (TBS), redundancy version (RV), new data indicator, number of layers and precoding information (applicable to some scheduling schemes as described below).

In a first method, the eNB may perform the scheduling by controlling the transmissions and the transmission parameters, such as on a per-TTI dynamic basis. The D2D WTRUs may be configured to monitor the eNB PDCCH or ePDCCH for D2D link scheduling purposes as well as traditional transmission scheduling. Alternatively, other signaling methods may be used such as those described in more detail below. The eNB may have control of the transmission time and transmission parameters used by the WTRUs in the D2D links. A WTRU may provide feedback information including link information and HARQ information directly to the eNB, such that the eNB scheduler may perform proper scheduling decisions for the D2D link using the received information and knowledge of the RF channel conditions between the WTRUs.

It may be assumed that the eNB controlled scheduling is performed either on a TTI basis or on a semi-persistent manner. Further, the resources may either be pre-allocated, in which case the D2D scheduling assignment may be reduced in size (for example, it may not need to carry resource block information for example), or alternatively, the D2D scheduling assignment may include one or more parameters related to the resource allocation.

Figure 6:
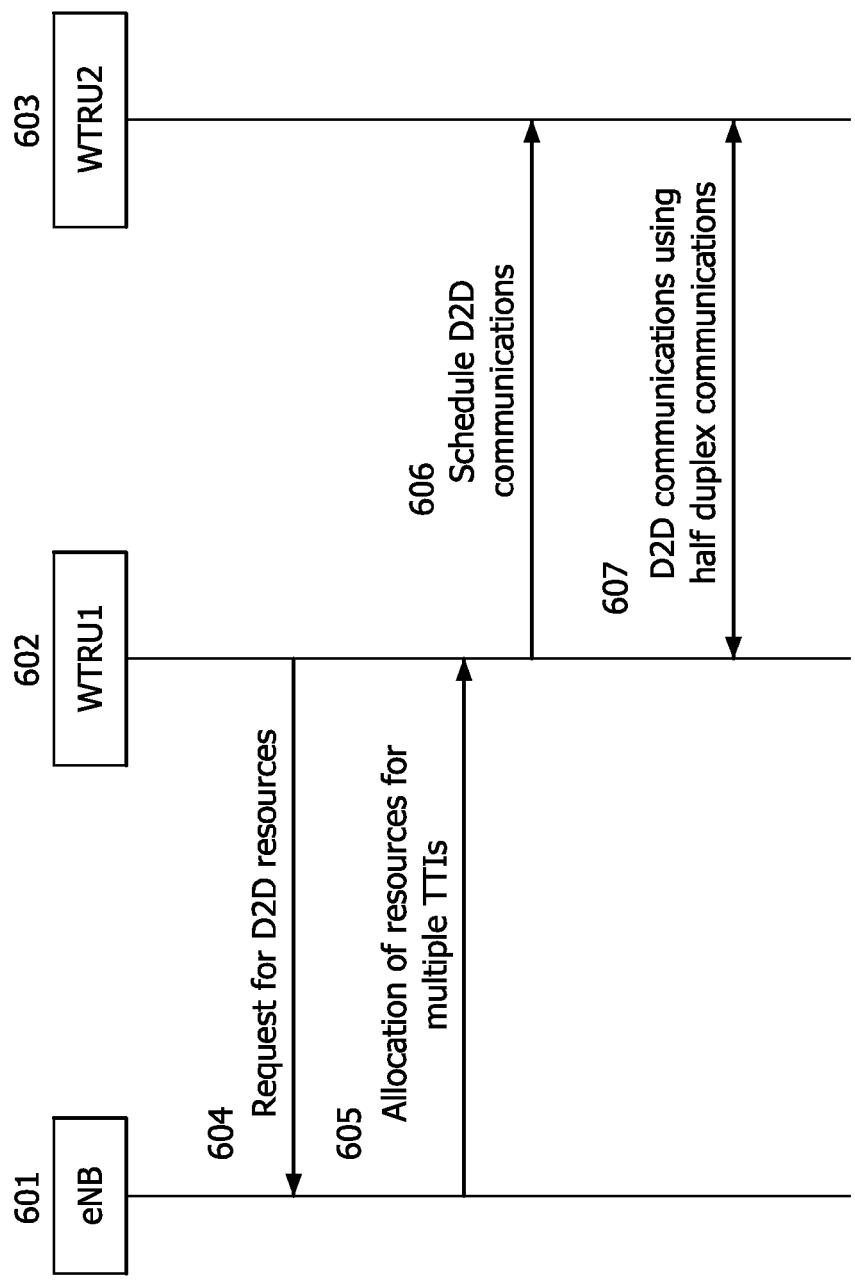
FIG. 6 is an example method of eNB controlled scheduling.

FIG. 6 is an example method of eNB controlled scheduling. WTRU1 602 may transmit a request 604 for D2D resources to an eNB 601 requesting resources for performing D2D communications. WTRU1 602 may receive an allocation of resources 605 for multiple transmission time intervals (TTI) from the eNB 601 to be used for D2D communications. WTRU1 602 may schedule D2D communications 606 with WTRU2 603 during the allocated resources. WTRU1 602 may perform D2D communications 607 with WTRU2 603 using half duplex communications.

When the resources are not pre-allocated, the eNB may have the additional task of signaling the resource allocation within the scheduling assignment for the D2D link. The examples disclosed, for the case where the resources may be pre-allocated, may also apply to the case where the resources are not pre-allocated. To support the latter, additional signaling may be required in the scheduling assignment. More specifically, the D2D WTRU may receive the resource block assignment information and/or the carrier indicator in the case where multiple carriers may be used for the D2D Link.

In TTI-by-TTI scheduling, the eNB may perform the scheduling of the D2D link on a per-TTI basis. The D2D WTRUs may monitor the PDCCH (and/or the ePDCCH depending on the configuration or any other TTI-based DL control channel) for D2D scheduling assignment. Since the eNB does not transmit the data on the D2D link, the D2D scheduling assignment may be destined to both D2D WTRUs in that D2D link. One WTRU (the transmitting device) may receive the D2D scheduling assignment and may interpret it as transmit D2D scheduling assignment and the other WTRU (the receiving device) may interpret it as a received D2D scheduling assignment. Alternatively, the eNB may independently address and transmit assignments to a transmitting and a receiving WTRU to provide a transmit D2D scheduling assignment and receive a D2D scheduling assignment respectively. The assignments may be provided using two PDCCH or ePDCCH signals, for example, one for each WTRU.

Further, because the eNB is not transmitting the data part, a delay between the D2D scheduling assignment and the actual data transmission may be required and defined. The D2D WTRU may receive the D2D scheduling assignment via the PDCCH and/or ePDCCH. For conciseness, hereafter the PDCCH will be written out for the D2D scheduling assignment. It may be understood that other channels such as the ePDCCH may also be used for receiving the D2D scheduling assignment. The D2D WTRU may determine that it is the target for a specific D2D scheduling assignment, for example, by using one of the solutions described herein. The WTRU may then decode the content of the D2D scheduling assignment and determine when to apply the transmit/receive assignment.

Since the eNB makes the assignment without transmitting the associated data, the data associated to the D2D scheduling assignment may not be transmitted or received in the same subframe as the one carrying the assignment. The D2D WTRUs may determine the timing of the scheduling assignment by using one of the following solutions: fixed-timing or implicit relation, explicit timing, or the first opportunity to transmit or receive.

For fixed-timing or implicit relation, the D2D WTRU may be configured with a fixed timing (either via RRC configuration or fixed by the specifications) that may be applied between the reception of the D2D scheduling assignment and application of the assignment (transmission or reception). For explicit timing, the actual timing or time of scheduling assignment may be indicated explicitly in the scheduling assignment message. For example, the eNB may indicate to the WTRU a specific subframe or subframe offset for the associated assignment.

In the case where resources are pre-allocated, the WTRU may determine the time of scheduling based on the first opportunity to transmit or receive, according to the pre-allocated resources. In one example, this first opportunity may take place N subframes after the reception of the scheduling assignment, where N may be predefined or signaled by the RRC. In another example, the WTRU may be configured with a minimum delay to apply the scheduling assignment. For example, the WTRU may be configured to apply the scheduling assignment at least Mmin subframes after receiving it, where Mmin may be fixed in the specifications (such as Mmin=2) or configured via RRC signaling. The WTRU may also be configured to discard a scheduling assignment if it has been received Mmax subframes ago, where Mmax may also be fixed in the specifications or received via RRC signaling.

In per-TTI scheduling where the RB resources are pre-allocated, the D2D WTRU may be configured to use the whole pre-allocated bandwidth. In such a case, the WTRU may be configured to receive a (smaller) number of scheduling parameters, such as, for example, MCS, HARQ Process number, redundancy version, target transmitting/receiving WTRU identities, new data indicator, and start/stop indication.

And in the case where the RBs are not pre-allocated, the additional RB parameters may also be carried in the scheduling assignment. Other parameters may also be included in the assignment.

In semi-static scheduling, the eNB may perform scheduling in a semi-static way. This approach may be similar to the TTI-by-TTI approach with the main difference being that the scheduling cycle is longer for each WTRU in the D2D link. Further this approach may lead to reduced signaling overhead. In this approach the D2D WTRUs may monitor the PDCCH for scheduling assignments. The D2D WTRUs may be configured to monitor a subset of the PDCCH subframes. The D2D WTRU may determine whether or not a scheduling assignment is to be applied using one of the methods described herein. In this context, the D2D WTRU scheduling assignment may last for more than one subframe. The validity of the scheduling assignment may be determined, for example, by using explicit indication or implicit determination.

For explicit indication, the D2D WTRU may be configured with a semi-static validity period. For example, the WTRU may be configured for example via L2/RRC signaling with a validity period that is applied. The D2D WTRU may receive the validity period explicitly via the scheduling assignment. In such a situation, the validity period may change between scheduling assignments. The static or RRC-configured validity period may be overridden by a more dynamic validity period signaled with the scheduling assignment.

For implicit determination, the validity period may be implicitly determined, for example, based on the D2D WTRU buffer size as signaled to the eNB. For semi-static scheduling where the RB resources are pre-allocated, the D2D WTRU may be configured to use the whole pre-allocated bandwidth. In such a case, the WTRU may be configured to receive a (smaller) number of scheduling parameters in a semi-static way, such as, for example, MCS, target transmitting/receiving WTRU identities, and validity period.

If the RBs are not pre-allocated, the additional RB parameters may also be carried in the scheduling assignment. Other parameters may also be included in the assignment as described herein.

The eNB may control the D2D link HARQ operations on a per-TTI basis by transmitting small-size HARQ control scheduling assignments, which may be received by the WTRUs in the D2D link. The HARQ control scheduling assignments may also be transmitted over the PDCCH, and may carry, for example, HARQ process number, RV, and/or new bit indicator. Additional resource indication may be provided.

Where the MCS and HARQ operation is controlled by the D2D WTRU entities, the eNB scheduling task may arbitrate the resources. In such cases, the eNB may transmit an optimized scheduling assignment on the PDCCH carrying a short amount of information to control the D2D link. Such information may include, for example, one or more of start/stop indication, target transmitting/receiving WTRU identities, validity period, and maximum number of bits. Other relevant parameters may be included as well. Thus, in this semi-static approach to D2D link scheduling, the eNB may transmit semi-static scheduling assignments on a multiple-TTI basis, and HARQ control scheduling assignments on a per-TTI basis. When the eNB schedules resources in a set of or pre-allocated D2D resources, the eNB may use a reduced RB indexing scheme. The eNB may index the RB resources within the pre-allocated set instead of using conventional RB indexing.

It is understood that the solutions described above may also be achieved by utilizing an L2 MAC control PDU to schedule the WTRUs in a semi-static manner or an L3 RRC control message. The content of the MAC control PDU may be similar to the content described above for the cases where PDCCH carries the semi-static scheduling.

For a D2D link, link adaptation may not be a critical component of the scheduling. A D2D WTRU may be configured with a finite set of scheduling parameters where, if more than one, each set may be indexed. A WTRU may receive an index to one of the parameters set for the transmission in the D2D subframe in the control signaling that schedules a transmission.

Where the resources are not pre-allocated, the eNB may have the additional task of signaling the resource allocation within the scheduling assignment for the D2D link. Many of the concepts outlined above for the case where the resources are pre-allocated may also apply to the case where the resources are not pre-allocated. To support the latter, additional signaling may be needed in the scheduling assignment. More specifically, the D2D WTRU may also receive the RB assignment information and the carrier indicator in the case where multiple carriers may be used for the D2D Link.

In a second example for D2D scheduling, the D2D WTRU may control, at least in part, the transmission scheduling. In this approach, it may be assumed that the D2D WTRUs are pre-allocated as a set of resources and that scheduling over these resources may be carried out by the D2D WTRUs.

The set of resources may include a set of shared resources to be used between the WTRUs in the same D2D link. The D2D WTRUs associated to a D2D link may determine which D2D WTRU and when the D2D WTRU uses those configured resources. Thus the scheduling in this context may include two parts: resource arbitration and scheduling itself.

The resource arbitration may ensure that no collision occurs or collisions occur rarely on the D2D link. The resource arbitration may also mitigate the impact of collisions.

In an alternate resource allocation context, the D2D WTRUs in a D2D link may be allocated using a separate set of resources (presumably over orthogonal resources) by the network. In such cases, there may be no contention on the resource and each WTRU in the D2D link may be free to transmit when data becomes available. The pre-allocated resource information may include the transmission and reception opportunities for each D2D WTRU. In another solution, the transmission opportunities may be determined based by the transmitting WTRU as its buffer becomes non-empty, for example.

Each D2D WTRU in the D2D link may determine the transmission parameters (or link-adaptation parameters) and when to transmit; that is, there is no master-slave relationship. The scheduling functionality may be performed by the transmitting WTRU performing the scheduling decision and transmission parameter selection. The transmitting WTRU may provide the scheduling control information required to decode the data to the receiving WTRU(s) in the D2D link. This scheduling control information may be hereafter referred to as the receive scheduling assignment. This may be achieved by the D2D WTRU transmitting scheduling control information (potentially on a new control channel) to the receiving device to convey the transmission parameters to the receiver (so that the data may be decoded properly). Conversely, the receiving D2D WTRU may monitor this control channel to determine the transmission parameters.

Alternatively, the transmitting WTRU may not transmit control information. In such cases, the receiving WTRU may perform blind decoding on the allocated resources. This task may be simplified if a subset of the MCS is allowed for the given allocated resources. The set of allowed MCS may be determined by the D2D WTRUs in the link via a set of defined rules, or configured explicitly for example via RRC signaling.

The receiving D2D WTRU may perform the scheduling and transmission parameter selection for the associated transmitting WTRU based on received/channel quality detected in the associated D2D frequency and resources. The receiving entity may signal to the transmitting WTRU using any of the methods described above the scheduling assignment with the appropriate parameters. In order to properly schedule the D2D WTRUs, sufficient information may be exchanged between the receiving device and transmitting device. For instance, buffer status reporting, scheduling request and power headroom reports may be reported from the transmitting device to the receiving D2D WTRUs.

The eNB may control the resources arbitration process and indicate to the D2D WTRUs which WTRUs gets access to the resources. In this context, the D2D WTRUs may pre-allocate the resources and may be configured to determine the link adaptation parameters and perform the scheduling. The D2D WTRU may receive an indication by the eNB that it has access to the radio resource for transmission. The D2D WTRU may determine the scheduling parameters and (link adaptation parameter) and may transmit data on the D2D link. The D2D receiving WTRU may receive the eNB indication and monitor the D2D link for reception. The eNB may further control the resources for the HARQ retransmissions. Alternatively, the transmitting D2D WTRUs may indicate to the eNB when all HARQ processes have completed so that the eNB may release the resource and allocate it to the other D2D WTRU.

Mechanisms to signal scheduling information and resource allocation may be included. Solutions for signaling scheduling control information (for example, scheduling assignments) and resource allocation may be provided.

The eNB may signal resource allocation or scheduling assignments to D2D WTRUs for a specific D2D link. Such control information may be carried over the PDCCH (or ePDCCH), for example. The control information (which may include, for example, resource allocation or scheduling assignments) originating in an eNB may be targeted for a transmission on a traditional link (for example, transmission from eNB to WTRU or from WTRU to eNB) or for a transmission/reception on a D2D link. The WTRU may differentiate and identify the purpose of the scheduling assignments.

Furthermore, when the scheduling assignment is targeted to the D2D link and in the context where WTRUs in a D2D link are scheduled to transmit or receive on a given resource, the WTRUs may be informed of whether or not a given scheduling assignment is a transmit scheduling assignment or a receive D2D scheduling assignment.

The following solutions may be used by the eNB and WTRUs in a D2D link to determine the purpose of the scheduling assignment (D2D link or traditional link) and/or to determine the target direction of the assignment (transmit or receive).

A control channel may be a downlink control channel transmitted by an eNB (for example, PDCCH, ePDCCH, and the like). The eNB may schedule dynamically each D2D transmission of a given D2D link. The eNB may transmit D2D WTRU-specific control information, where, for example, a DCI that includes a resource allocation for a D2D transmission may be addressed to at most one D2D WTRU (for example, either a transmitting D2D WTRU or a receiving D2D WTRU).

The eNB may transmit D2D-session specific control information, where, for example, a DCI that includes a resource allocation for a D2D transmission may be addressed to any D2D WTRU that is part of a given D2D session (for example, to a transmitting D2D WTRU as well as to one or more receiving D2D WTRU).

The eNB may transmit D2D link-specific control information, where, for example, each DCI that includes a resource allocation for a D2D transmission may be addressed to any D2D WTRU that is configured for D2D operation on the concerned D2D link (for example, to a transmitting D2D WTRU and/or to one (or more) receiving D2D WTRU for a given D2D session). The eNB may transmit HARQ process-specific control information.

The eNB may transmit cell-specific control information, where, for example, a DCI that includes a resource allocation for a D2D transmission may be addressed to any D2D WTRU that is configured for D2D operation (for example, to a transmitting D2D WTRU and/or to one (or more) receiving D2D WTRU for a given D2D session and/or for a given D2D link).

A WTRU may receive control signaling related to D2D communications at least in part as a function of the addressing of the signaling. The signaling may be L3 addressing, L2 addressing, or L1 addressing. For L3 addressing, a WTRU may receive an RRC PDU that contains control signaling for a D2D communication, which control information includes an identity. For L2 addressing, a WTRU may receive a MAC PDU that contains a MAC CE carrying control signaling for a D2D communication, which control information includes an identity. For L1 addressing, a WTRU may attempt decoding of downlink control information (DCI) on PDCCH/ePDCCH (or similar) using an identity that corresponds to a specific RNTI. A DCI itself may include an identity.

For any of the above cases, the identity may correspond to a D2D link and/or to a D2D session. For example, WTRUs participating in a D2D session may be assigned with a D2D-RNTI. Alternatively (or additionally), such identity may correspond to that of a HARQ process. Alternatively, such identity may be that of a specific WTRU (for example, the WTRU's cell RNTI (C-RNTI) or a WTRU-dedicated RNTI for D2D control signaling). Alternatively, such identity may be assigned to a role within the session. For example, WTRUs participating in a session may be assigned with an identity that corresponds to a master, slave, receiver and/or transmitter role in the D2D session. Combinations thereof are also possible. A WTRU may be assigned with a plurality of identities.

When a WTRU determines that the identity matches that for which it is configured for D2D communications, the WTRU may process the control information accordingly. For example, resource allocation and/or scheduling of transmission parameters may be addressed and applicable to a group of WTRUs, for example, all WTRUs in the same D2D session. WTRUs in a D2D session may be further subdivided into a transmitting WTRU and any WTRUs that receive the transmission. This may be applied on a per D2D subframe (and/or D2D scheduling subframe).

In order to determine the purpose of the scheduling assignment (D2D link or traditional link) and/or to determine the target direction of the assignment (transmit or receive), the eNB and WTRUs in a D2D link may use identities, different PDCCH search spaces, explicit indication, and implicit indication.

The technique of using identities may provide different identities that are used to differentiate the WTRU traditional link from the D2D link assignments. In a first example, the D2D WTRU may be configured with a different identity for the D2D link, such as D2D-RNTI. The D2D WTRU may monitor the PDCCH for the conventional C-RNTI and for the D2D-RNTI. When the D2D WTRU decodes the C-RNTI on the PDCCH, the D2D WTRU may determine that the associated DCI is associated to the traditional link and may act according to the conventional rules. When the D2D WTRU decodes the D2D-RNTI on the PDCCH, the D2D WTRU may determine that the associated DCI (or control information) is associated to the D2D link and apply the control information accordingly.

The D2D WTRUs in the same D2D link may be configured with the same D2D identity. In such cases, the D2D identity may be associated to the link and may be referred to as the D2DL-RNTI. The D2D WTRU may differentiate a D2D link assignment from a traditional link assignment by the identity associated to the assignment as described above for the case of the D2D-RNTI.

Different identities may be used to differentiate not only the WTRU traditional link from the D2D link assignments, but also for whether the assignment corresponds to a transmission or to a reception for the concerned WTRUs. For example, the identity ma correspond to a specific type of operation for one or more WTRUs in a given D2D link, such as a receive operation or a transmit operation using the concerned assignment. As an example, the D2D WTRU may be configured with a D2Dtx-RNTI and a D2Drx-RNTI. The D2D WTRU may monitor the PDCCH for the conventional C-RNTI and for the D2Dtx-RNTI and D2Drx-RNTI. When the D2D WTRU decodes the C-RNTI on the PDCCH, the D2D WTRU may determine that the associated DCI is associated to the traditional link and may act according to the conventional rules. When the D2D WTRU decodes the D2Dtx-RNTI on the PDCCH, the D2D WTRU may determine that the associated DCI (or control information) is associated to the D2D link and may apply the transmit control information accordingly. Likewise, when the D2D WTRU decodes the D2Drx-RNTI on the PDCCH, the D2D WTRU may determine that the associated DCI (or control information) is associated to the D2D link and may apply the receive control information accordingly.

As another example, the eNB may perform semi-static resource allocation for a group of D2D communication links within the same cell or region. The group may include, for example, all D2D communications links operating within the same cell. In this approach, the eNB may reserve resources for the group of D2D links in a semi static manner. WTRUs within the group may then independently determine when to use the pool of resources and schedule their transmissions.

The D2D WTRU may be configured with a specific PDCCH search space for a D2D link-related assignment (hereafter referred to as the D2D-PDCCH search space). The D2D WTRU may be configured to monitor the D2D-PDCCH search space for its C-RNTI. When the D2D WTRU detects its C-RNTI in the D2D-PDCCH search space, the D2D WTRU may determine that the associated DCI or scheduling assignment is targeting the D2D link.

The WTRU may be configured with another identity to search on the D2D-PDCCH search space; in that case one of the solutions above (with different identities) may be used in conjunction to the D2D-PDCCH search space.

Alternatively, the D2D WTRU may be configured with a D2D-PDCCH search space dedicated for transmit scheduling assignments and a D2D-PDCCH search space for receive scheduling assignment. The WTRU may determine the actual assignment direction (transmit vs. received) based on the search space location of the scheduling assignment.

In another set of solutions, a new DCI format may be used to indicate a D2D link scheduling assignment. When the D2D WTRU receives this new DCI format (for example, with its C-RNTI or other identity as described above), the D2D WTRU may determine that the DCI targets the D2D link. The new DCI format may include a transmit/receive indicator flag. The D2D WTRU may determine the link direction by reading this flag.

In one set of examples, where the D2D WTRUs of the same D2D link are configured with the same D2DL-RNTI, the new DCI format may include the information on the link direction for each WTRU. In one example, in the context where up to two WTRUs may be configured in the same D2D link, a single flag may be used to differentiate the link direction. The D2D WTRUs may be configured for instance via RRC signaling on how to interpret the flag (one D2D WTRUs interprets a given flag value as a transmit indication and the other as receive indication).

The WTRU may be configured to re-interpret the carrier indicator bits on the PDCCH. The carrier indicator bits may indicate for instance which of the D2D WTRU in the link is assigned for transmission; the other WTRUs in the D2D link may interpret this as a receive indication.

The D2D WTRUs in a D2D link may be configured with a specific set of D2D link resources. These resources may include, for example, a set of subframes and/or radio blocks (RB). Each resource may further be associated for each D2D WTRU as a transmit or receive resource. When the D2D WTRU detects its identity on the PDCCH (for example, its C-RNTI or other configured identity) during one of those subframes or configured resource, the D2D WTRU may determine that the related scheduling assignment is for the D2D link. The D2D WTRU may further determine that a given D2D scheduling assignment is a transmit/receive assignment based on the resource configuration.

In the context where the D2D WTRUs have some autonomy in scheduling, the D2D WTRUs may signal this control information. For convenience of presentation the solutions are described in the context when either the UL band is used for the D2D link or the DL band is used for the D2D link. It may be understood, however, that the solutions proposed may also be used in any band; that is a solution proposed under the context of the D2D link transmitted on the DL band may also be used when the D2D link is transmitted on the UL band and vice-versa.

Uplink-like control and/or data channels may be used for the purpose of D2D transmission. Such channel may be suitable for scenarios where the uplink band may be used for D2D transmissions, the scheduling information may be provided in the UL data or control region according to one or a combination of the following solutions.

The D2D WTRU may use the PUCCH region to transmit scheduling information, including scheduling assignments. The D2D WTRU may use, for example, an existing PUCCH format (such as PUCCH format 3) or a new PUCCH format for transmission of the control information. In one example of a new PUCCH format, the PUCCH format 3 may be extended with a CRC to add error detection capability to the channel for improved reliability. Other new channels may also be designed for the purpose of carrying scheduling information. Since the PUCCH region may also be used for the traditional link, the D2D WTRU may be configured to use the PUCCH region for the D2D link using specific resources configured by the network.

The scheduling assignment (or scheduling control information) and data channel may be transmitted simultaneously from the D2D transmitting WTRU to provide scheduling information to the receiving WTRU. This may be accomplished by using a PUS CH-like channel on the D2D link.

The D2D transmitting WTRU may be configured to transmit the scheduling assignment for the D2D link at a specific time prior to transmitting the associated PUSCH data transmission (for example, n subframes, or n slot, . . . and the like), where n may be zero in which case the scheduling assignment and data transmission may be transmitted simultaneously). Likewise, the D2D receiving WTRU may be configured to receive the PUSCH data by a specific time after receiving the scheduling assignment.

The D2D receiving WTRU may determine the scheduling and transmit the scheduling assignment to the D2D transmitting WTRU. This scheduling assignment may also be carried on the PUCCH for example, or on a new channel.

The assigned resources for the WTRU, for example, data region, may be used to transmit control scheduling information. A new control channel may be defined in order to carry the D2D scheduling information. The new control channel may, for example, be mapped to a subset of the data region symbols that are allocated for the D2D data transmission. A set of resource blocks may be reserved for the purpose of carrying the scheduling control information.

Downlink-like control and/or data channels may be used for the purpose of D2D transmission. Such a channel may be suitable for scenarios where the downlink band is used for D2D transmissions. The scheduling information may be provided in the DL data or control region as described herein.

The D2D WTRU may use the PDCCH region to transmit scheduling information, including scheduling assignments. The D2D WTRU may use, for example, an existing PDCCH format or a new PDCCH format for transmission of the control information. Alternatively, the D2D WTRU may use ePDCCH to carry the scheduling control information. Alternatively, a new channel may also be designed for the purpose of carrying scheduling information.

In order to coordinate between the WTRUs in the D2D link, the following solutions for arbitration and resource scheduling may be used.

In one solution, the eNB may control the resources arbitration process and indicate to the D2D WTRUs which WTRUs gets access to the resource. In this context, the D2D WTRUs may be pre-allocated the resources and may be further configured to determine the link adaptation parameters and perform the scheduling.

In one solution, the D2D WTRU may receive an indication by the eNB that it has access to the radio resource for transmission. The D2D WTRU may determine the scheduling parameters and (link adaptation parameter) and transmit data on the D2D link. The D2D receiving WTRU may also receive the eNB indication and monitor the D2D link for reception.

For example, a resource may be activated for transmission for at most one WTRU at any given time, while for other WTRUs in the D2D session it may be activated for reception. In this case, the concerned WTRU(s) may implicitly determine whether the received control signaling for scheduling (if any) for a given D2D subframe is for a grant (transmission) or for an assignment (reception).

The eNB may further control the resources for the HARQ retransmissions. Alternatively, the transmitting D2D WTRUs may indicate to the eNB when all HARQ processes have completed so that the eNB may release the resource and allocate it to the other D2D WTRU.

In a master-slave example, one WTRU is a master, hereafter referred to as a D2D master, and may perform the resource arbitration and thus determine when each D2D WTRU within a D2D link (such as including the D2D master and one or more D2D slaves) has access to the resource for transmission.

In one example, all the transmission parameters may be selected and scheduled by the D2D master. The D2D master may determine which D2D WTRU uses the resource, the actual set of resources used, and the link-adaptation parameters (for example, MCS, BW, and the like), as well as the HARQ control information. In this approach the D2D master may be informed of the D2D slave's buffer statuses and CSI.

In another example, the D2D master may control a subset of the scheduling aspects. Some transmissions parameters may be controlled and issued by the D2D master and the transmitting D2D WTRU (for example, D2D slave) may have some autonomy in determining the remaining transmission parameters. In one example of this approach, the D2D master may determine the transmission time and resource (which may include the actual resource block (RB) and the transmission power) of the D2D WTRU, and the transmitting D2D WTRU may determine one or more of the link-adaptation parameters (such as the MCS, HARQ control parameters, and the like). In another example, the D2D master may determine the transmission time and power, and the transmitting WTRU may determine the actual RBs, MCS and HARQ control parameters, and the like.

The eNB may determine and configure the master in the D2D link. The D2D WTRU may be configured to be a master, for example, via RRC signaling, and may be populated with the appropriate information. For example, the appropriate information may include one or more of the following elements: list of D2D slave(s) and identities, radio resource information for the D2D link (such as carrier, frequency (FDD UL or FDD DL), bandwidth, list of RBs, list of subframes, power information (such as power limit), and the like), validity period, D2D link identity, and the like.

In another example, to determine the D2D master, the D2D WTRUs associated to a D2D link may perform negotiation to determine the D2D master. The identified D2D master may indicate it to the network, which in turns may confirm the D2D master with the appropriate configuration.

In another example, no master-slave relationship may be established and the WTRUs in a D2D link may use sensing and contention-based mechanisms to gain access to the allocated medium.

In another example, a WTRU may be configured with synchronous HARQ processes, where a HARQ process is associated to one (or more) of the D2D subframe and/or given resource allocation. In this case, the WTRU may invoke the proper UL HARQ process for the corresponding D2D subframe(s). Alternatively, a WTRU may be configured with a sequence of WTRUs identity. The WTRU may determine from the received sequence after what other WTRU it may be allowed to perform transmissions.

In another example, a WTRU may be configured such that it may keep a token until it releases it. For example, a WTRU may be configured with a QoS value (such as a GBR, a PBR, or the like) such that a WTRU, once assigned the token for the use of resources of the D2D link, may transmit data until either it has no data in its buffer or until its QoS allocation is met for the current cycle (whichever comes first). The WTRU may indicate that a token is released by inserting a special identifier in the last transmission, (such as MAC padding or the identity of the next WTRU to get the token, for example, in combination with a sequential approach).

In another example, a WTRU may be configured a list of WTRU identities and with a QoS value (such as a GBR, a PBR, or the like) for each WTRU. A WTRU may attempt to request or claim the resources of the D2D link (for example, a token) when it determines that all other WTRUs have met their share of transmission assignments on the D2D link according to their respective QoS value, when it detects that no transmission is received from other WTRUs on the D2D link, or when it detects padding from other WTRUs on the D2D link or if it determines that the resources of the link are unused.

Scheduling requests (SR) for D2D transmissions.

A Scheduling Request (SR) may be used for requesting resources for new transmission on the D2D link. The SR may be triggered according to any of the criteria described herein.

A Buffer Status Reporting (BSR) on PRACH using a request for more resources by dedicated PRACH/preamble and codepoint may be described herein.

In order to report buffer status several methods are disclosed below. For example, scheduling buffer requests and triggers may be utilized. The logical channels associated with or mapped over a D2D link may be part of or assigned the same LCG (logical channel group). Alternatively, more than one LCG may exist for a D2D link but logical channels for traditional link and D2D link may not be part of the same LCG. A D2D LCG may correspond to a LCG that contains a logical channel mapped to a D2D link. A traditional link LCG is a LCG that may contain logical channels mapped to a traditional link. A regular/periodic BSR may be triggered and transmitted to the eNB and/or to a scheduling WTRU according to the current rules, such as D2D data, for a logical channel which may belong to a LCG, and become available for transmission in the RLC entity or in the PDCP entity. The logical channel may either be a D2D logical channel or a traditional link logical channel. Triggering and transmission may occur using periodicBSR-Timer for D2D BSR, and/or retxBSR-Timer for D2D BSR.

Different triggers may be defined for a D2D BSR and a traditional link BSR. A D2D BSR may be triggered and transmitted to the eNB and/or to a scheduling WTRU with guidance from UL data, for a logical channel which may belong to a D2D LCG, and become available for transmission in the RLC entity or in the PDCP entity. The data may belong to a logical channel with higher priority than the priorities of the logical channels which may belong to any D2D LCG or a D2D logical channel and for which data is already available for transmission, or there is no data available for transmission for any of the logical channels which belong to a LCG, in which case the BSR is referred below to as "D2D BSR". PeriodicBSR-Timer for D2D BSR may expire including a D2D specific timer that is configured for reporting D2D periodic BSR. RetxBSR-Timer may expire and the WTRU may have data available for transmission for any of the D2D logical channels which belong to a D2D LCG, in which case the BSR may be referred to as "Regular D2D BSR."

A traditional link BSR may be triggered and transmitted to the eNB or to the scheduling WTRU according to one or a combination of the following criteria:

UL data, for a logical channel which may belong to a traditional link LCG, may become available for transmission in the RLC entity or in the PDCP entity. The data either belongs to a logical channel with higher priority than the priorities of the logical channels which belong to any traditional link LCG or traditional link logical channel and for which data is already available for transmission, or there is no data available for transmission for any of the logical channels which belong to a LCG, in which case the BSR is referred below as regular "traditional link BSR".

The periodicBSR-Timer for traditional link BSR may expire. In this case a traditional link specific timer may be configured for reporting traditional link periodic BSR.

RetxBSR-Timer may expire and the WTRU may have data available for transmission for any of the traditional link logical channels which belong to a traditional LCG, in which case the BSR may be referred to as "Regular traditional link BSR."

The WTRU may trigger a padding BSR and may transmit the BSR to the eNB inside a transport block that corresponds to UL resources that may be allocated for UL transmission to an eNB (such as a transmission on the traditional link), if the number of padding bits is equal to or larger than the size of the Buffer Status Report MAC control element plus its subheader. The BSR in this case may correspond to a regular BSR (for example, that contain information for all logical channels) for data applicable to radio bearers associated with the traditional link or it may correspond to a D2D BSR, for example, that contain information about the amount of data available for transmission on a D2D link or for a D2D session or to corresponding bearers. Alternatively, such a D2D BSR may be transmitted insides a transport block that corresponds to UL resources that are allocated for transmission on a D2D link, if the number of padding bits is equal to or larger than the size of the Buffer Status Report MAC control element plus its subheader.

According to the different criteria described above the WTRU may trigger either a regular BSR or periodic BSR according to the current BSR rules. In an alternate solution, different triggers may be used for regular/periodic D2D BSR and regular/periodic traditional link BSR.

The content of a D2D BSR may correspond to the D2D LCG ID and buffer size of the logical channels belonging to the D2D LCG ID. If more than one D2D LCG has data available for transmission in the TTI where the D2D BSR is transmitted then a BSR containing the LCG and buffer size of these LCG may be included, for example, a long BSR. The content of a D2D BSR may also correspond to a BSR report that contains the buffer status information of the D2D LCG and the buffer status of the traditional link BSR. Based on the configured LCG IDs, the scheduling entity may determine which LCG ID and buffer status to take into account for scheduling decisions.

The content of a traditional BSR may correspond to the traditional link LCG ID and buffer size of the logical channels belonging to the traditional link LCG ID. If more than one traditional link LCG has data available for transmission in the TTI where the traditional link BSR is transmitted then a BSR containing the LCG and buffer size of these LCG may be included, for example, a long BSR. The traditional link BSR may also correspond to a BSR report that contains the buffer status information of the D2D LCG and the buffer status of the traditional link BSR. Based on the configured LCG IDs the scheduling entity may determine which LCG ID and buffer status to take into account for scheduling decisions.

The eNB may differentiate between a traditional link BSR and a D2D specific BSR based on the content of the BSR (for example, the logical channel IDs in the BSR) or alternatively an explicit indication in the BSR may be used or a D2D specific MAC control element may be introduced.

When triggered according to at least one of the BSR triggers below, the normal BSR, D2D BRS or traditional link BSR may be reported to either an eNB and/or a D2D WTRU. Reporting BSR to an eNB and/or a D2D WTRU for scheduling purposes may include a normal/regular BSR that is transmitted to the eNB. The eNB scheduler may use the information received in the BSR, which contains information on logical channels mapped to D2D and traditional links, to provide resource allocation and scheduling for the D2D WTRUs. A D2D BSR may be transmitted to at least one D2D WTRU in the D2D link from a transmitting D2D WTRU. The D2D BSR may be used by the receiving or master WTRU to perform scheduling control of the transmitting WTRUs. Since the eNB may be in charge of resource allocation and scheduling, in addition to the D2D BSR transmitted to the D2D WTRU, the BSR information for the logical channels involved in a D2D link and the traditional link may also be provided to the eNB. This may be achieved via the WTRU independently transmitting a D2D BSR to the network and a traditional link BSR once triggered according to the conditions described herein. The WTRU may also transmit one regular BSR that contains the information of all active logical channels regardless of whether there are D2D logical channels or traditional link channels. The eNB based on LCH ID and a mapping of the corresponding link may adjust scheduling decisions.

A WTRU connected to a cell and with a configured D2D link may perform at least one of the following. Reception of control signaling addressed to the WTRU's C-RNTI (and/or a grant received by random access RNTI (RA-RNTI)) may be prioritized over control signaling related to the operation on the D2D link, in case the control signaling is for a transmission (or reception) for the same subframe.

A WTRU may prioritize the occurrence of a configured measurement gap over a D2D scheduling subframe and/or a D2D subframe, in particular if the WTRU is required to perform the measurements to meet the requirements for measurement accuracy.

A WTRU may invalidate a D2D configuration for transmission on a D2D link and/or for transmission of uplink control information (UCI) to the eNB and/or to another WTRU for the operation of the D2D link if the TAT expires and which TAT corresponds to the cell whose uplink resources are used for the D2D link.

A WTRU may invalidate a D2D configuration for transmission on a D2D link and/or for transmission of UCI to the eNB and/or to another WTRU for the operation of the D2D link if it determines DL RLF or UL RLF.

A WTRU may invalidate a D2D configuration for transmission on a D2D link and/or for transmission of UCI to the eNB and/or to another WTRU for the operation of the D2D link if it performs a transition to an IDLE mode.

A WTRU may invalidate a D2D configuration for transmission on a D2D link. A WTRU may also invalidate a D2D configuration for transmission of a UCI to the eNB. A WTRU may also invalidate a D2D configuration to another WTRU for the operation of the D2D link if the resources allocated to the D2D link correspond to a secondary cell (SCell) of the WTRU's configuration and if the SCell is deactivated. For example, if the SCell is part of a secondary timing advance (TA) group and following the deactivation, the WTRU may no longer have uplink timing alignment for any cell of the same TA group.

A WTRU may prioritize the (re)transmission of a preamble on a physical random access channel (PRACH) over transmission or reception on a D2D link in a D2D subframe, if the D2D subframe collides with a PRACH occasion in which the WTRU would otherwise transmit a preamble.

A WTRU may prioritize the reception of a random access response (RAR) over any transmission or reception on a D2D link in a D2D subframe, if the subframe is part of a RAR reception window. A WTRU may prioritize a configured grant (UL semi-persistent scheduling (SPS)) over transmission or reception in a D2D subframe. A WTRU may prioritize a configured assignment (DL SPS) over transmission or reception on a D2D link in a D2D subframe.

A WTRU in IDLE mode may be configured with a D2D link. For example, the WTRU may be configured for reception of transmission on the D2D link. In a subframe in which the WTRU is expected to monitor the paging channel the WTRU may prioritize decoding of the P-RNTI and attempt reception of a paging assignment in its paging occasion over reception or reception on a D2D link in a D2D subframe that may collide with the paging occasion.

If discontinuous reception (DRX) is configured for a WTRU connected to a cell and with a configured D2D link, when a DRX cycle is configured, the Active Time may additionally include the time while control signaling for a D2D link of the WTRU's configuration may be received from the eNB on the (e)PDCCH (for example, a D2D scheduling subframe).

When a DRX cycle is configured, the Active Time may exclude the time while any subframe for which a D2D transmission may be scheduled (such as a D2D subframe), for example, for a WTRU that is a receiving WTRU of the D2D link (assuming that a transmitting WTRU may continue to monitor the (e)PDCCH in such subframe). This may be a function of the WTRU's capabilities.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for use by a first wireless transmit/receive unit (WTRU), the method comprising:
    transmitting a request for device-to-device (D2D) communication resources to an enhanced Node B (eNB), wherein the request includes a D2D buffer status report indicating a buffer size of at least one D2D logical channel;
    receiving a D2D grant for a plurality of transmission time intervals (TTIs), wherein the D2D grant provides: a set of resources to be used for D2D transmissions, a resource hopping assignment and transmit power control (TPC) information;
    determining scheduling assignment (SA) resources to transmit at least one SA, based on the received D2D grant, wherein the SA resources comprise a set of resource blocks;
    determining D2D transmission parameters, wherein at least one of the determined D2D transmission parameters is determined based on at least the received D2D grant and another one of the determined D2D transmission parameters is a modulation and coding scheme (MCS) determined via a radio resource configuration (RRC) signal received from the eNB;
    determining D2D data resources to transmit D2D data, based on the received D2D grant;
    transmitting the at least one SA on the determined SA resources prior to transmitting the D2D data, wherein the SA includes the determined D2D transmission parameters; and
    transmitting, to a second WTRU, the D2D data on the determined D2D data resources indicated in the SA in accordance with the received resource hopping assignment, received TPC information and determined D2D transmission parameters.

2. The method as in claim 1, wherein the first WTRU is configured with one Hybrid Automatic Repeat Request (HARQ) entity per D2D link.

3. The method as in claim 2, wherein the first WTRU has a fixed number of uplink (UL) HARQ processes for the HARQ entity.

4. The method as in claim 3, wherein the UL HARQ process is asynchronous.

5. The method as in claim 3, wherein the UL HARQ process is synchronous.

6. The method as in claim 2, wherein the first WTRU has a fixed number of downlink HARQ processes for the HARQ entity.

7. A first wireless transmit/receive unit (WTRU) comprising:
a transmitter configured to transmit a request for device-to-device (D2D) communication resources to an enhanced Node B (eNB), wherein the request includes a D2D buffer status report indicating a buffer size of at least one D2D logical channel;
a receiver configured to receive a D2D grant for multiple transmission time intervals (TTIs), wherein the D2D grant provides: a set of resources to be used for D2D transmissions, a resource hopping assignment and transmit power control (TPC) information;
a processor configured to determine scheduling assignment (SA) resources to transmit an SA, based on the received D2D grant;
the processor further configured to determine D2D transmission parameters, wherein at least one of the determined D2D transmission parameters is determined based on at least the received D2D grant and another one of the determined D2D transmission parameters is a modulation and coding scheme (MCS) determined via a radio resource configuration (RRC) signal received from the eNB;
the processor further configured to determine D2D data resources to transmit D2D data, based on the received D2D grant;
the transmitter further configured to transmit the SA on the determined SA resources prior to transmitting the D2D data, wherein the SA includes the determined D2D transmission parameters; and
the transmitter further configured to transmit, to a second WTRU, the D2D data on the determined D2D data resources indicated in the SA in accordance with the received resource hopping assignment, received TPC information and determined D2D transmission parameters.

8. The first WTRU of claim 7, wherein the first WTRU is configured with one Hybrid Automatic Repeat Request (HARQ) entity per D2D link.

9. The first WTRU of claim 8, wherein the first WTRU has a fixed number of uplink (UL) HARQ processes for the HARQ entity.

10. The first WTRU of claim 9, wherein the UL HARQ process is asynchronous.

11. The first WTRU of claim 9, wherein the UL HARQ process is synchronous.

12. The first WTRU of claim 8, wherein the first WTRU has a fixed number of downlink HARQ processes for the HARQ entity.

13. A method for use in a first wireless transmit/receive unit (WTRU), the method comprising:
receiving an allowed device-to-device (D2D) resource pool from one or more system information blocks (SIBs);
selecting a subset of resources from the received D2D resource pool to utilize for D2D transmission;
transmitting a scheduling assignment prior to transmitting D2D data on at least a portion of resources indicated in the scheduling assignment, wherein the scheduling assignment is based on the selected subset of resources; and
transmitting D2D data, to a second WTRU, on the resources indicated in the scheduling assignment;
wherein a D2D transmission buffer is determined to be non-empty prior to transmitting the D2D data.

14. The method as in claim 13, wherein the scheduling assignment comprises a modulation and coding scheme (MCS) indicator.

15. The method as in claim 14, wherein the transmitted D2D data is modulated and coded according to the MCS indicator.

16. The method as in claim 13, wherein the D2D data is transmitted in accordance with a priority level and a maximum power level.

17. The method as in claim 1, further comprising:
receiving an indication of a semi-static validity period;
wherein the D2D data is transmitted during the semi-static validity period.

18. The method of claim 1, wherein the D2D data is transmitted in accordance with a priority level and a maximum power level.

19. The first WTRU of claim 7, further comprising:
the receiver further configured to receive an indication of a semi-static validity period;
wherein the D2D data is transmitted during the semi-static validity period.

* * * * *